(12) United States Patent
Fujita et al.

(10) Patent No.: US 12,099,842 B2
(45) Date of Patent: Sep. 24, 2024

(54) ARITHMETIC PROCESSING DEVICE AND ARITHMETIC PROCESSING METHOD

(71) Applicant: Fujitsu Limited, Kawasaki (JP)

(72) Inventors: Hisanari Fujita, Kawasaki (JP); Sota Sakashita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 144 days.

(21) Appl. No.: 18/087,215

(22) Filed: Dec. 22, 2022

(65) Prior Publication Data

US 2023/0297378 A1 Sep. 21, 2023

(30) Foreign Application Priority Data

Mar. 15, 2022 (JP) .................................. 2022-040759

(51) Int. Cl.
*G06F 9/30* (2018.01)
(52) U.S. Cl.
CPC .......... *G06F 9/3013* (2013.01); *G06F 9/3001* (2013.01); *G06F 9/30043* (2013.01)
(58) Field of Classification Search
CPC .. G06F 9/3013; G06F 9/3001; G06F 9/30043; G06F 9/3869; G06F 9/30014
See application file for complete search history.

(56) References Cited

U.S. PATENT DOCUMENTS

| 5,860,000 A | 1/1999 | Biswas et al. |
| 2016/0342415 A1 | 11/2016 | Okazaki et al. |

FOREIGN PATENT DOCUMENTS

| JP | 09-212359 A | 8/1997 |
| JP | 2016-218855 A | 12/2016 |

*Primary Examiner* — Farley Abad
(74) *Attorney, Agent, or Firm* — WHDA, LLP

(57) ABSTRACT

An arithmetic processing device includes an instruction storage configured to store an arithmetic instruction and a data cache configured to cache a calculation result of the arithmetic instruction. A plurality of floating-point registers arranged on a side of the instruction storage is configured to store a register value used for executing the arithmetic instruction transferred from the instruction storage, and a plurality of floating point calculation circuits arranged on a side of the data cache is configured to perform a floating-point operation based on the arithmetic instruction, wherein a number of cycles is one when the register value is transferred from the instruction storage to one or more floating-point registers, among the plurality of floating point registers, arranged in positions closest in distance to the instruction storage.

6 Claims, 31 Drawing Sheets

FIG. 9

| ARITHMETIC INSTRUCTION | | 1 | 2 | 3 | 4 | 5 | 6 | 7 | 8 | 9 | 10 | 11 | 12 | 13 |
|---|---|---|---|---|---|---|---|---|---|---|---|---|---|---|
| RELATED EXAMPLE | F01 | P | PT | PT2 | B1 | B2 | X1 | X2 | X3 | X4 | U | UT | C | W |
| EMBODIMENT | F01 | P | PT | B1 | B2 | X1 | X2 | X3 | X4 | U | UT | C | W | |

F1

| LOAD INSTRUCTION | | | | | | | |
|---|---|---|---|---|---|---|---|
| RELATED EXAMPLE | F01 | $P_d$ | $T_d$ | $M_d$ | $B_d$ | $R_d$ | $R_dT$ |
| EMBODIMENT | F01 | $P_d$ | $T_d$ | $M_d$ | $B_d$ | $R_d$ | |

ARITHMETIC INSTRUCTION

| | | 1 | 2 | 3 | 4 | 5 | 6 | 7 | 8 | 9 | 10 | 11 | 12 | 13 |
|---|---|---|---|---|---|---|---|---|---|---|---|---|---|---|
| RELATED EXAMPLE | F01,F23 | P | PT | PT2 | B1 | B2 | X1 | X2 | X3 | X4 | U | UT | C | W |
| EMBODIMENT | F01 | P | PT | B1 | B2 | X1 | X2 | X3 | X4 | U | UT | C | W | |
| | F23 | P | PT | PT2 | B1 | B2 | X1 | X2 | X3 | X4 | U | UT | C | W |

↑ G1

LOAD INSTRUCTION

| | | 1 | 2 | 3 | 4 | 5 | 6 |
|---|---|---|---|---|---|---|---|
| RELATED EXAMPLE | F01,F23 | $P_d$ | $T_d$ | $M_d$ | $B_d$ | $R_d$ | $R_dT$ |
| EMBODIMENT | F01 | $P_d$ | $T_d$ | $M_d$ | $B_d$ | $R_d$ | |
| | F23 | $P_d$ | $T_d$ | $M_d$ | $B_d$ | $R_d$ | $R_dT$ |

| | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| RELATED EXAMPLE | | | | | | | | | | | | | | | | | |
| F01, F23 | P | PT | PT2 | B1 | B2 | X1 | X2 | X3 | X4 | U | UT | C | W | | | | |
| | | | | | | | | | | | | | | X4 | UT | C | W |
| EMBODIMENT | | | | | | | | | | | | | | | | | |
| F01 | P | PT | B1 | B2 | X1 | X2 | X3 | X4 | U | UT | C | W | | | | | |
| F23 | P | PT | PT2 | B1 | B2 | X1 | X2 | X3 | X4 | U | UT | C | W | | | | |
| F01 | | | | | P | PT | B1 | B2 | X1 | X2 | X3 | X4 | U | UT | C | W | |
| F23 | | | | | P | PT | PT2 | B1 | B2 | X1 | X2 | X3 | X4 | U | UT | C | W |

| | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| RELATED EXAMPLE | | | | | | | | | | | | | | |
| F01,F23 LOAD INSTRUCTION | $P_d$ | $T_d$ | $M_d$ | $B_d$ | $R_d$ | $R_dT$ | | | | | | | | |
| ARITHMETIC INSTRUCTION | | P | PT | PT2 | B1 | B2 | X1 | X2 | X3 | X4 | U | UT | C | W |
| EMBODIMENT | | | | | | | | | | | | | | |
| F01 LOAD INSTRUCTION | $P_d$ | $T_d$ | $M_d$ | $B_d$ | $R_d$ | | | | | | | | | |
| F23 | $P_d$ | $T_d$ | $M_d$ | $B_d$ | $R_d$ | $R_dT$ | | | | | | | | |
| F01 | | P | PT | B1 | B2 | X1 | X2 | X3 | X4 | U | UT | C | W | |
| F23 ARITHMETIC INSTRUCTION K1 | | P | PT | PT2 | B1 | B2 | X1 | X2 | X3 | X4 | U | UT | C | W |

FIG. 20

RELATED EXAMPLE

| | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| fadd z2, z0, z1 (F0123) | P | PT | PT2 | B1 | B2 | X1 | X2 | X3 | X4 | U | UT | C | W | | | | |
| fsub z4, z2, z3 (F0123) | | | | | P | PT | PT2 | B1 | B2 | X1 | X2 | X3 | X4 | U | UT | C | W |

EMBODIMENT

| | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| fadd z2, z0, z1 (F01) | P | PT | B1 | B2 | X1 | X2 | X3 | X4 | U | UT | C | W | | | | | |
| fadd z2, z0, z1 (F23) | P | PT2 | B1 | B2 | X1 | X2 | X3 | X4 | U | UT | C | W | | | | | |
| fsub z4, z2, z3 (F01) | | | P | PT | PT2 | B1 | B2 | X3 | X4 | X2 | X3 | X4 | U | UT | C | W | |
| fsub z4, z2, z3 (F23) | | | P | PT | PT2 | B1 | B2 | X1 | X2 | X3 | X4 | U | UT | C | W | | |

SEND CALCULATION RESULT IN X4
OF fadd TO OP1R IN B2 OF fsub.
(BYPASS) (M1)

NO CYCLE
IMPROVEMENT (M2)

FIG. 23

| | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| RELATED EXAMPLE | $P_d$ | $T_d$ | $M_d$ | $B_d$ | $R_M$ | $R_dT$ | | | | | | | | |
| ldr v2, [x0, x1] (F01) | | P | PT | PT2 | B1 | B2 | X1 | X2 | X3 | X4 | U | UT | C | W |
| fsub v4, v2, v3 (F01) | | | | | | | | | | | | | | |

SEND READ RESULT IN Rd OF ldr TO OP1R IN B2 OF fsub. (BYPASS) (N1)

| | 1 | 2 | 3 | 4 | 5 | 6 | 7 | 8 | 9 | 10 | 11 | 12 | 13 |
|---|---|---|---|---|---|---|---|---|---|---|---|---|---|
| EMBODIMENT | $P_d$ | $T_d$ | $M_d$ | $B_d$ | $R_M$ | | | | | | | | |
| ldr v2, [x0, x1] (F01) | | P | PT | B1 | B2 | X1 | X2 | X3 | X4 | U | UT | C | W |
| fsub v4, v2, v3 (F01) | | | | | | | | | | | | | |

1 CYCLE IMPROVEMENT (N2)

FIG. 26

| | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| RELATED EXAMPLE | | | | | | | | | | | | | | |
| ldr z2, [x0, x1] (F0123) | P$_a$ | T$_a$ | M$_a$ | B$_a$ | R$_d$ | R$_d$T | | | | | | | | |
| fsub z4, z2, z3 (F0123) | P | PT | PT2 | B1 | B2 | X1 | X2 | X3 | X4 | U | UT | C | W | |
| EMBODIMENT | | | | | | | | | | | | | | |
| ldr z2, [x0, x1] (F01) | P$_a$ | T$_a$ | M$_a$ | B$_a$ | R$_d$ | | | | | | | | | |
| ldr z2, [x0, x1] (F23) | P$_a$ | T$_a$ | M$_a$ | B$_a$ | R$_d$ | R$_d$T | | | | | | | | |
| fsub z4, z2, z3 (F01) | P | PT | B1 | B2 | X1 | X2 | X3 | X4 | U | UT | C | W | | |
| fsub z4, z2, z3 (F23) | P | PT | PT2 | B1 | B2 | X1 | X2 | X3 | X4 | U | UT | C | W | |

SEND READ RESULT IN Rd AND RdT
OF ldr TO OP1R IN B2 OF fsub.
(BYPASS) (P1)

NO CYCLE
IMPROVEMENT (P2)

FIG. 28

| | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| | P | PT | PT2 | B1 | B2 | X1 | X2 | X3 | X4 | U | UT | C | W | | | | |
| | | | | | P | PT | PT2 | B1 | B2 | X1 | X2 | X3 | X4 | U | UT | C | W |

RELATED EXAMPLE fadd z2, z0, z1 (F0-7)
fsub z4, z2, z3 (F0-7)

| | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| | P | PT | B1 | B2 | X1 | X2 | X3 | X4 | U | UT | C | W | | | | | |
| | P | PT | PT2 | B1 | B2 | X1 | X2 | X3 | X4 | U | UT | C | W | | | | |
| | | | P | PT | B1 | B2 | X1 | X2 | X3 | X4 | U | UT | C | W | | | |
| | | | P | PT | PT2 | B1 | B2 | X1 | X2 | X3 | X4 | U | UT | C | W | | |

EMBODIMENT fadd z2, z0, z1 (F01)
fadd z2, z0, z1 (F2-7)
fsub z4, z2, z3 (F01)
fsub z4, z2, z3 (F2-7)

SEND CALCULATION RESULT IN X4 OF fadd TO B2 OF fsub. (BYPASS) (Q1)

NO CYCLE IMPROVEMENT (Q2)

FIG. 30

RELATED EXAMPLE fadd z2, z0, z1 (F0-7)

fsub z4, z2, z3 (F0-7)

| 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|----|----|----|----|----|----|----|----|----|
| P | PT | PT2 | PT3 | B1 | B2 | X1 | X2 | X3 | X4 | U | UT | C | W | | | | |
| | | | | | P | PT | PT2 | PT3 | B1 | B2 | X1 | X2 | X3 | X4 | U | UT | C | W |

EMBODIMENT fadd z2, z0, z1 (F01)

fadd z2, z0, z1 (F23)

fadd z2, z0, z1 (F4-7)

fsub z4, z2, z3 (F01)

fsub z4, z2, z3 (F23)

fsub z4, z2, z3 (F4-7)

SEND CALCULATION RESULT IN X4 OF fadd TO B2 OF fsub. (BYPASS) (R1)

NO CYCLE IMPROVEMENT (R2)

ARITHMETIC PROCESSING DEVICE AND ARITHMETIC PROCESSING METHOD

CROSS-REFERENCE TO RELATED APPLICATION

This application is based upon and claims the benefit of priority of the prior Japanese Patent Application No. 2022-40759, filed on Mar. 15, 2022, the entire contents of which are incorporated herein by reference.

FIELD

The embodiments discussed herein are related to an arithmetic processing device and an arithmetic processing method.

BACKGROUND

In an arithmetic processing device in a processor core, a pipeline processing is performed in synchronism with clock pulses. Japanese Laid-open Patent Publication No. 2016-218855 and Japanese Laid-open Patent Publication No. 9-212359 are disclosed as related art.

SUMMARY

According to an aspect of the embodiments, an arithmetic processing device including an instruction storage configured to store an arithmetic instruction; a data cache configured to cache a calculation result of the arithmetic instruction; a plurality of floating-point registers arranged on a side of the instruction storage and configured to store a register value used for executing the arithmetic instruction transferred from the instruction storage; and a plurality of floating point calculation circuits arranged on a side of the data cache and configured to perform a floating-point operation based on the arithmetic instruction, wherein a number of cycles is one when the register value is transferred from the instruction storage to one or more floating-point registers, among the plurality of floating point registers, arranged in positions closest in distance to the instruction storage.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 9 is a time chart of an arithmetic instruction and a load instruction in a case where only the F01 lane is used in the related example and the embodiment;

FIG. 10 is a time chart of an arithmetic instruction and a load instruction in a case where the F23 lane is also used in the related example and the embodiment;

FIG. 12 is a bypass time chart illustrating processing from an arithmetic instruction to another arithmetic instruction in a case where the F23 lane is also used in the related example and the embodiment;

FIG. 14 is a bypass time chart illustrating processing from a load instruction to an arithmetic instruction in a case where the F23 lane is also used in the related example and the embodiment;

FIG. 20 is a bypass time chart from an arithmetic instruction to another arithmetic instruction using all four elements (F0, F1, F2, and F3) in the related example and the embodiment;

FIG. 23 is a bypass time chart from a load instruction to an arithmetic instruction using only two elements (F0 and F1) in the related example and the embodiment;

FIG. 26 is a bypass time chart from a load instruction to an arithmetic instruction using all four elements (F0, F1, F2, and F3) in the related example and the embodiment;

FIG. 28 is a bypass time chart from an arithmetic instruction to another arithmetic instruction using all eight elements (F0 to F7) in the related example and the embodiment;

FIG. 30 is a bypass time chart from an arithmetic instruction to another arithmetic instruction in a case where all eight elements (F0 to F7) are used and a time difference is set in three stages in the related example and the embodiment.

DESCRIPTION OF EMBODIMENTS

Related Art

Figure 1:
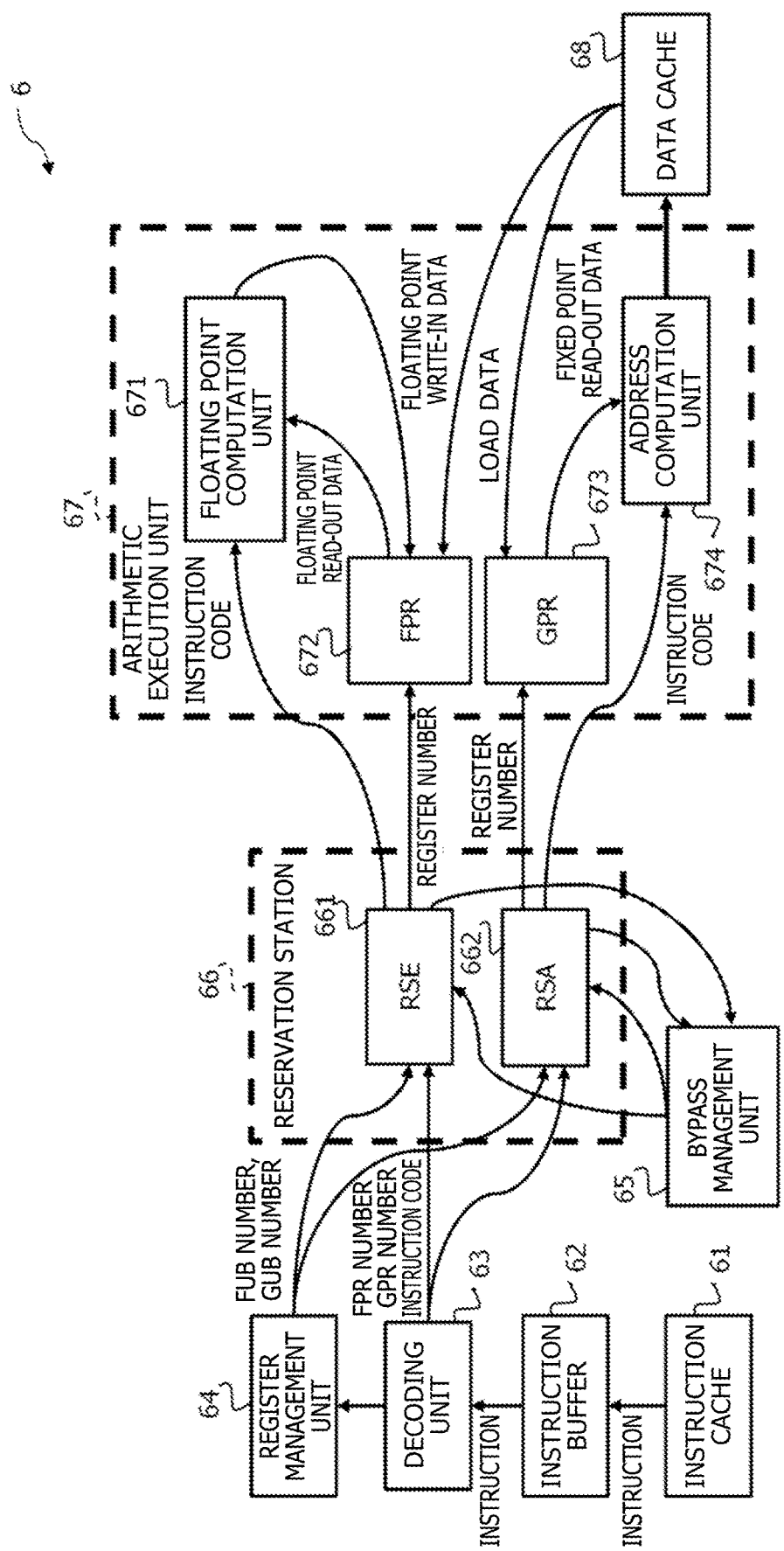
FIG. 1 is a block diagram schematically illustrating a hardware configuration example of a core portion of a processor in a related example.

FIG. 1 is a block diagram schematically illustrating a hardware configuration example of a core portion of a processor in a related example.

Instructions are stored in an instruction cache 61, and the read instructions are stored in an instruction buffer 62 and sequentially sent to a decoding unit 63. The decoding unit 63 interprets each instruction, and the instruction is input to a reservation station (RS) 66.

The RS 66 inputs the instructions to each of calculation units in the out-of-order mode. The RS 66 includes a reservation station for execute (RSE) 661 configured to store arithmetic instructions and a reservation station for address generate (RSA) 662 configured to store instructions such as "load", "store", and the like.

Both the RSE 661 and the RSA 662 are managed by a register management unit 64 and a bypass management unit 65.

The RSE 661 sends a register number to a floating point register (FPR) 672, and sends data referred to based on the register number to a floating point calculation unit 671. Based on an instruction code, the floating point calculation unit 671 performs calculation by using data sent from a floating point register (not illustrated). A calculation result is sent to the floating point register, and the register of the designated number is updated. The RSA 662 sends a register number to a fixed point register (GPR) 673, and sends data referred to based on the register number to an address calculation unit 674. The address calculation unit 674 sends the calculation result to a DATA cache 68, the DATA cache 68 returns data to the GPR 673 or FPR 672, and the register of the designated number is updated.

The floating point calculation unit 671, the FPR 672, the GPR 673, and the address calculation unit 674 function as an arithmetic execution unit 67.

Figure 2:
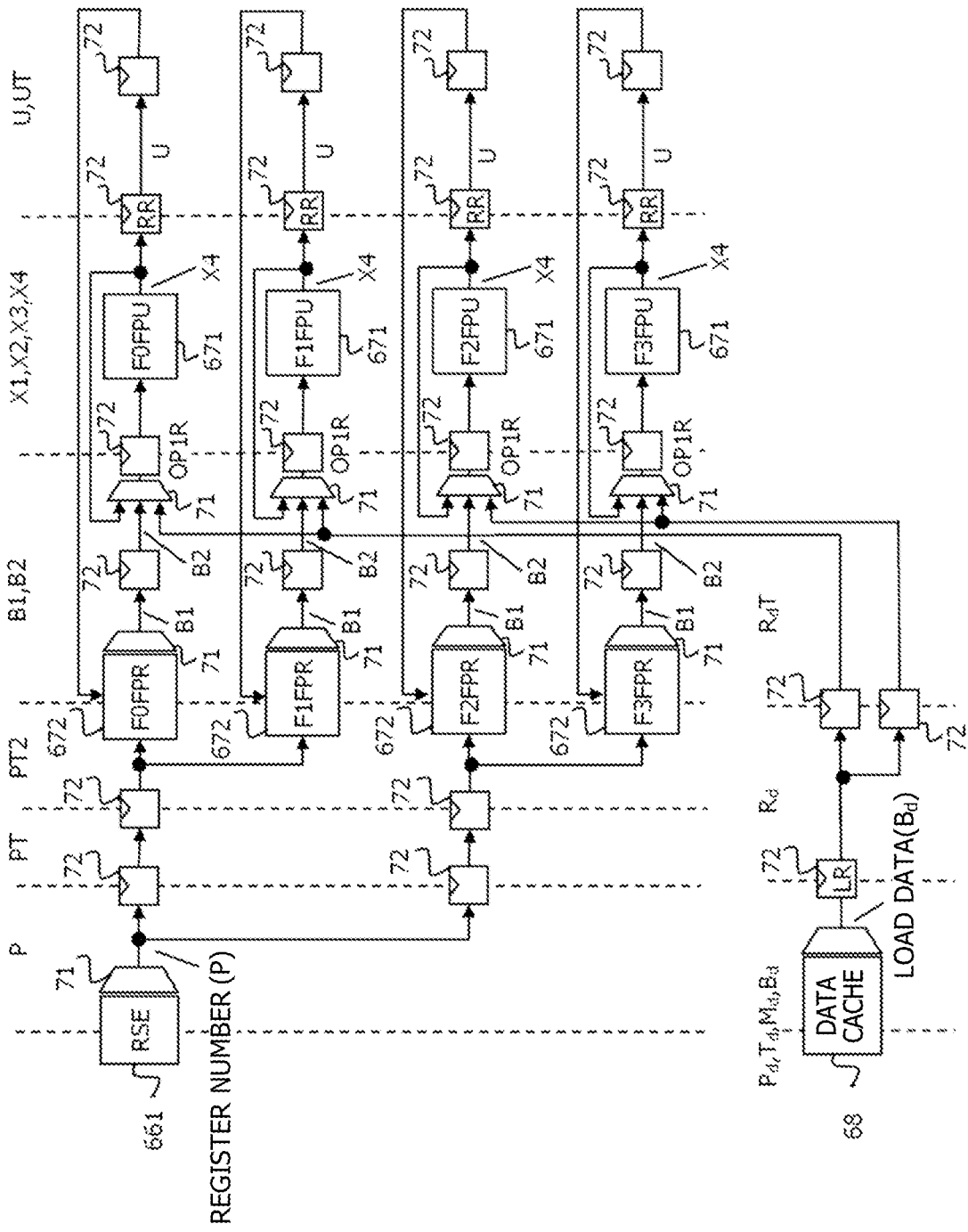
FIG. 2 is a block diagram explaining a data flow in an RSE, an FPR, an FPU, and a DATA cache in the related example.
Figure 3:
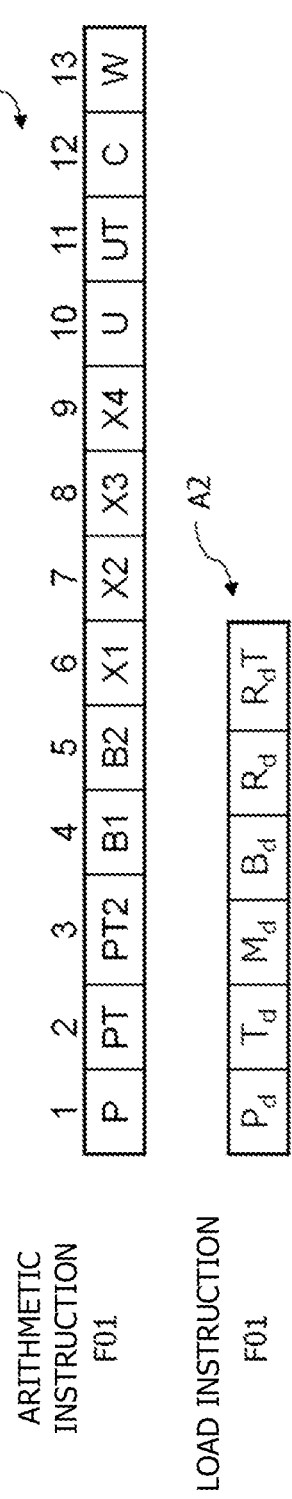
FIG. 3 is a time chart of an arithmetic instruction and a load instruction in a case where only an F01 lane is used in the related example.
Figure 4:
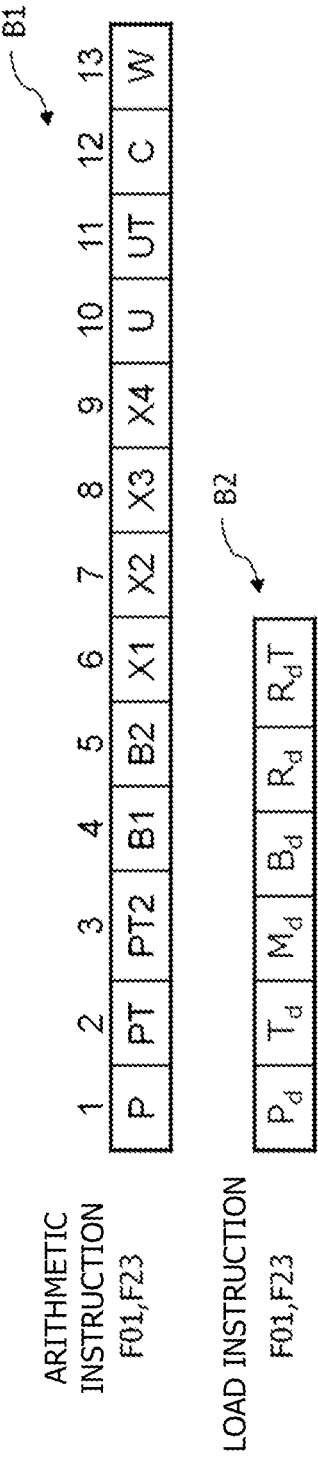
FIG. 4 is a time chart of an arithmetic instruction and a load instruction in a case where an F23 lane is also used in the related example.

FIG. 2 is a block diagram explaining a data flow in the RSE 661, the FPR 672, the floating point calculation unit (FPU) 671, and the DATA cache 68 in the related example. FIG. 3 is a time chart of an arithmetic instruction and a load instruction in a case where only an F01 lane is used in the related example. FIG. 4 is a time chart of an arithmetic instruction and a load instruction in a case where an F23 lane is also used in the related example.

Figure 5:
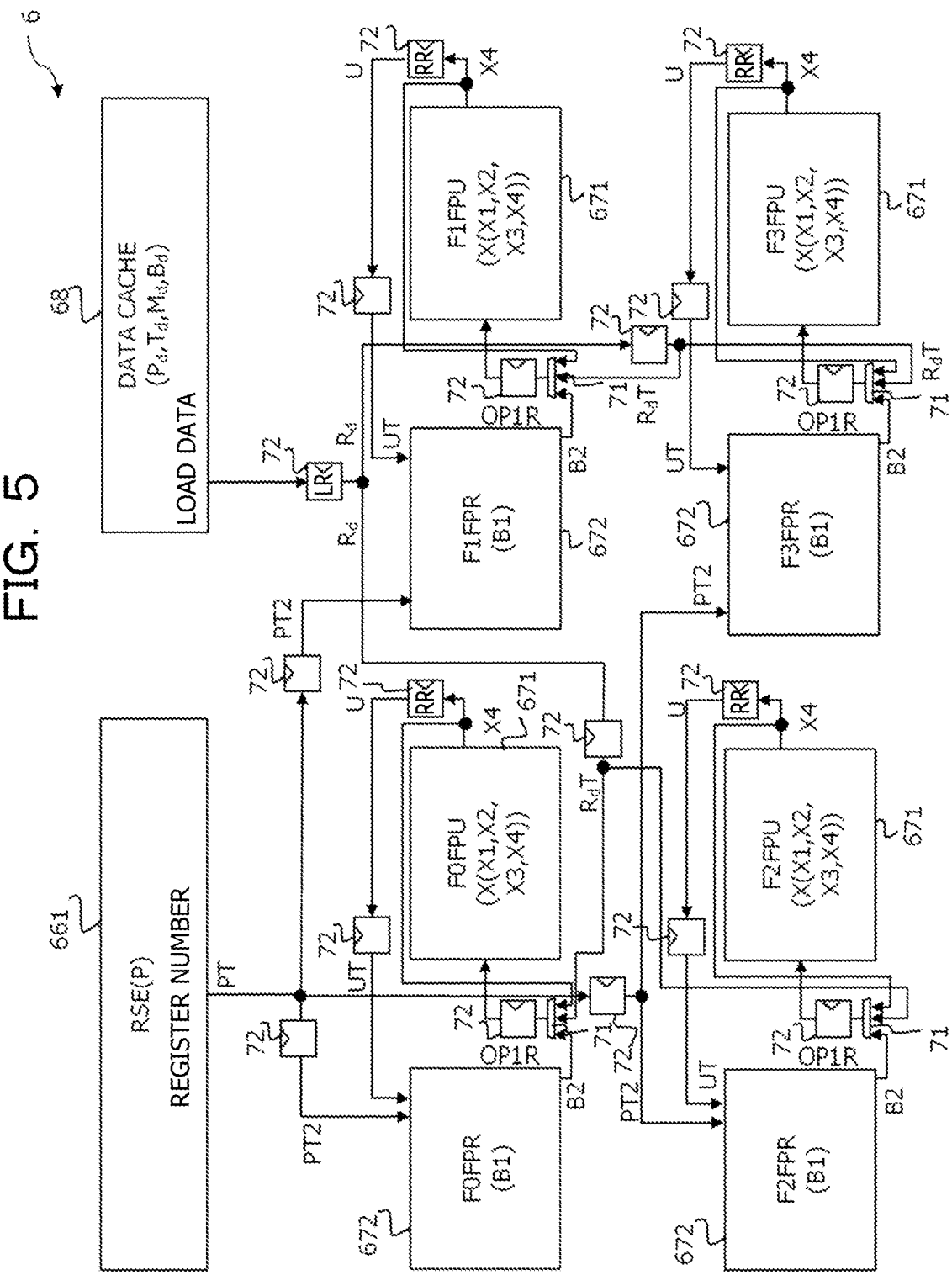
FIG. 5 is a block diagram explaining a first example of arrangement of the RSE, FPR, FPU, and DATA cache in the related example.

FIG. 2 illustrates an arithmetic instruction flow from the RSE 661 to the FPR 672 and FPU 671, and a load data flow from the DATA cache 68 to the FPU 671. In FIG. 2 and FIG. 5, a reference sign 71 denotes a selector and a reference sign 72 denotes a flip-flop or a register composed by a plurality of flip-flops.

The FPR 672, the floating point calculation unit 671, and the like support a SIMD operation having a maximum of four elements (F0 to F3) in which an 8-byte data width is taken as one element, and process an instruction using only the elements F0 and F1 (also noted as F01) and an instruction also using the elements F2 and F3 (also noted as F23).

In FIGS. 2 to 4, P, PT, PT2, B1, B2, X1, X2, X3, X4, U, UT, C, and W each denote a cycle name of pipeline processing of arithmetic instructions (see a reference sign A1 in FIG. 3 and a reference sign B1 in FIG. 4).

First, in the P cycle, a register number is sent from the RS 66 to the FPR 672 of each element, and the register number is transferred to the FPR 672 of each element (F0FPR, F1FPR, F2FPR, F3FPR) by taking two cycles of PT and PT2.

In the subsequent B1 cycle, a value of the FPR 672 corresponding to the transferred register number is read out, and the read value is sent to the flip-flop 72 indicated by OP1R (register that holds an operand) in the B2 cycle.

In the X1, X2, X3, and X4 cycles, the FPU 671 of each element (F0FPU, F1FPU, F2FPU, and F3FPU) simultaneously executes calculation, and in the X4 cycle, which is the last cycle, the calculation result is set in the flip-flop 72 indicated by result register (RR: a register that holds the calculation result).

In the U cycle, the calculation result is transferred to the FPR 672 of each element (F0FPR, F1FPR, F2FPR, and F3FPR), and the calculation result is written into the FPR 672 of each element (F0FPR, F1FPR, F2FPR, and F3FPR) in the UT cycle.

In the C and W cycles illustrated in FIGS. 3 and 4, instructions having been executed in the out-of-order mode are completed in the original execution order of the program, and resources of various registers such as the FPR 672, memories, and the like are updated and released.

Pd, Td, Md, Bd, Rd, and RdT cycles each indicate a cycle name of pipeline processing of a load instruction (see a reference sign A2 in FIG. 3 and a reference sign B2 in FIG. 4).

In the Pd cycle, the address sent from the address calculation unit 674 is sent to the DATA cache 68, and in the Td, Md, and Bd cycles, data of the sent address is read out and is set in the flip-flop 72 indicated by LR. In the Rd and RdT cycles, data of the flip-flop 72 indicated by LR is transferred to the flip-flop 72 indicated by OP1R of the FPU 671 of each element (F0FPU, F1FPU, F2FPU, and F3FPU).

FIG. 5 is a block diagram explaining a first example of arrangement of the RSE 661, FPR 672, FPU 671, and DATA cache 68 in the related example.

As illustrated in FIG. 5, since the F0FPR is close in distance to the RS 66 (in other words, the RSE 661), the register number may be transferred only in the PT cycle; however, the register number is transferred in two cycles of PT and PT2 corresponding to the F1, F2, and F3 FPRs 672 far from the RS 66. Since the F1FPU is close in distance to the DATA cache 68, the load data may be transferred only in the Rd cycle; however, the load data is transferred in two cycles of Rd and RdT corresponding to the F0, F2, and F3 FPUs 671 far from the DATA cache 68.

The reason why the transfer timing is determined corresponding to the farther FPUs in terms of distance is to simplify the pipeline processing including bypass operations. In the arrangement illustrated in FIG. 5, since the element close to the RSE 661 when viewed from the RSE 661 is different from the element close to the DATA cache 68 when viewed from the DATA cache 68, the distance is determined corresponding to the farther element.

Figure 6:
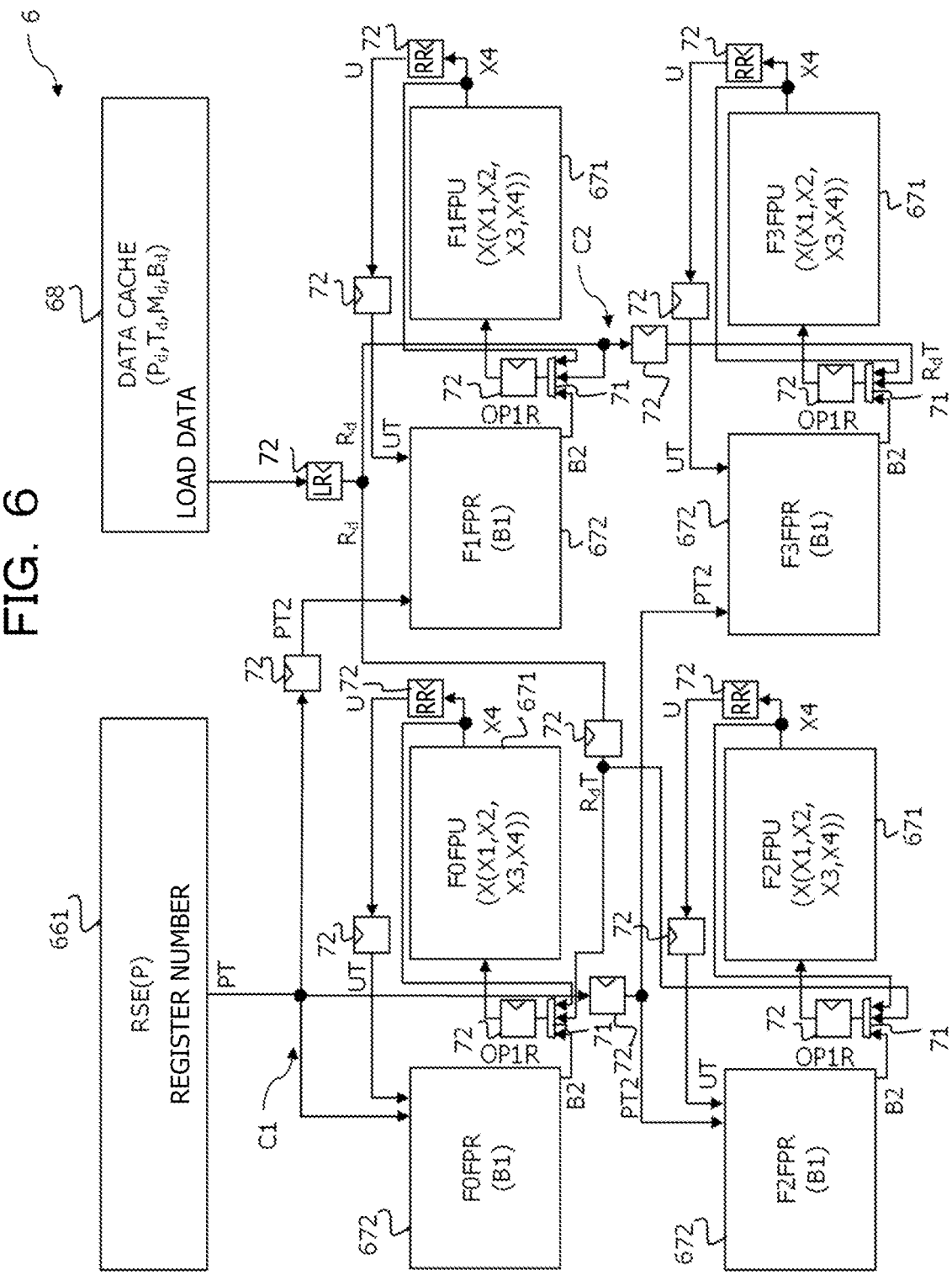
FIG. 6 is a block diagram explaining a second example of arrangement of the RSE, FPR, FPU, and DATA cache in the related example.

FIG. 6 is a block diagram explaining a second example of arrangement of the RSE 661, FPR 672, FPU 671, and DATA cache 68 in the related example.

FIG. 6 is an arrangement example in which, as compared with the arrangement example illustrated in FIG. 5, one cycle near the RS 66 is deleted in the cycles for the register number transfer from the RS 66 (see reference sign C1), and one cycle near the data cache 68 is deleted in the cycles for the load data transfer from the DATA cache 68 (see reference sign C2).

As for the register number transfer cycles, the PT2 cycle is deleted only in the F0FPR, and only the PT cycle is present therein. As for the load data transfer cycles, the RdT cycle is deleted only in the F1FPU, and the Rd cycle is present therein.

Figure 7:
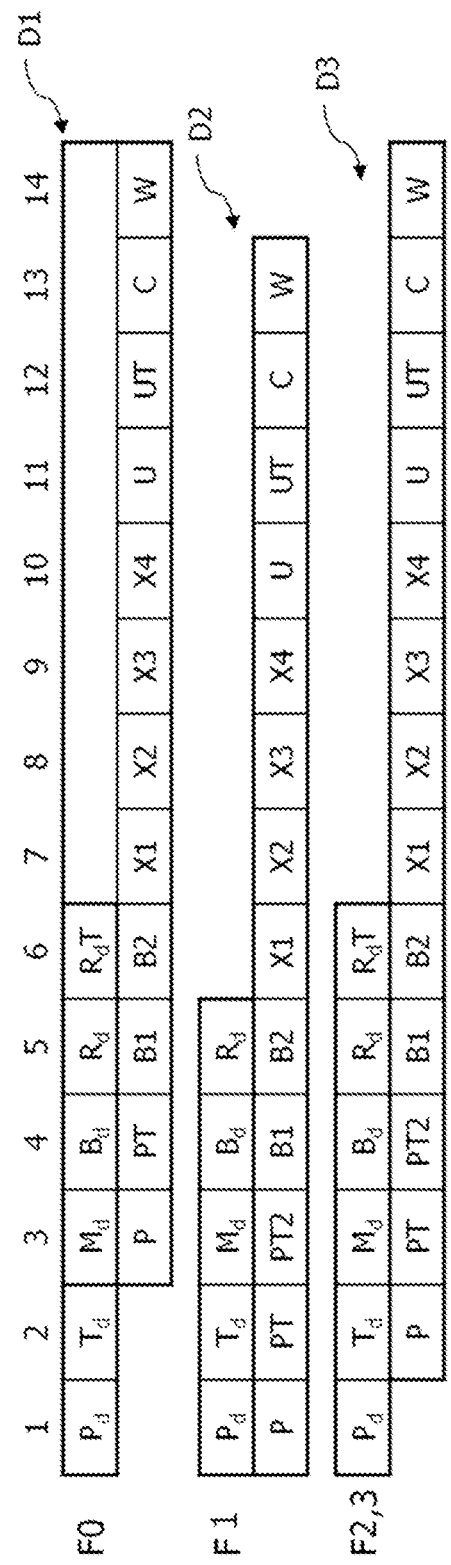
FIG. 7 is a time chart illustrating processing from a load instruction to an arithmetic instruction corresponding to the second example of the arrangement of the RSE, FPR, FPU, and DATA cache illustrated in FIG. 6.

FIG. 7 is a time chart illustrating processing from a load instruction to an arithmetic instruction corresponding to the second example of the arrangement of the RSE, FPR, FPU, and DATA cache illustrated in FIG. 6.

As illustrated in FIG. 6, when the number of cycles of an element near the RSE 661 when viewed from the RSE 661 and the number of cycles of an element near the DATA cache 68 when viewed from the DATA cache 68 are simply reduced, the timing of the P cycle at the bypass time from the load instruction to the arithmetic instruction differs in each element as illustrated in the time chart of FIG. 7 (see reference signs D1 to D3). Control in which the difference of each element is taken into consideration has to be carried out, and further, performance improvement is not expected, for example. Because of this, in the case of single instruction and multiple data (SIMD), the number of pipeline stages is basically determined corresponding to the farthest element. However, with the arrangement example illustrated in FIG. 6 as it is, the element near the RSE 661 when viewed from the RSE 661 is different from the element near the DATA cache 68 when viewed from the DATA cache 68, and thus there arises a risk that performance improvement is less likely to be expected.

SIMD includes an instruction using only the F01 and an instruction also using the F23. In consideration of the improvement of the instruction using only the F01, the transfer cycle to the F01FPR has to be aligned only to the PT cycle, and the transfer of load data from the DATA cache 68 to the F01FPU has to be aligned only to the Rd cycle. However, in the arrangement example illustrated in FIG. 6, the F0FPU is far from the DATA cache 68 and OP1R of the F1FPU is far from the RSE 661, therefore the cycles are not to be aligned.

According to one aspect, an object is to efficiently execute a floating point operation.

[A] EMBODIMENT

Hereinafter, an embodiment will be described with reference to the drawings. The following embodiment is merely exemplary and is in no way intended to exclude various modification examples or technical applications that are not explicitly described in the embodiment. For example, the present embodiment may be variously modified and implemented without departing from the spirit of the embodiment. Each of the drawings is not intended to include only the constituent elements illustrated in the drawing, and may include other functions and the like.

Figure 8:
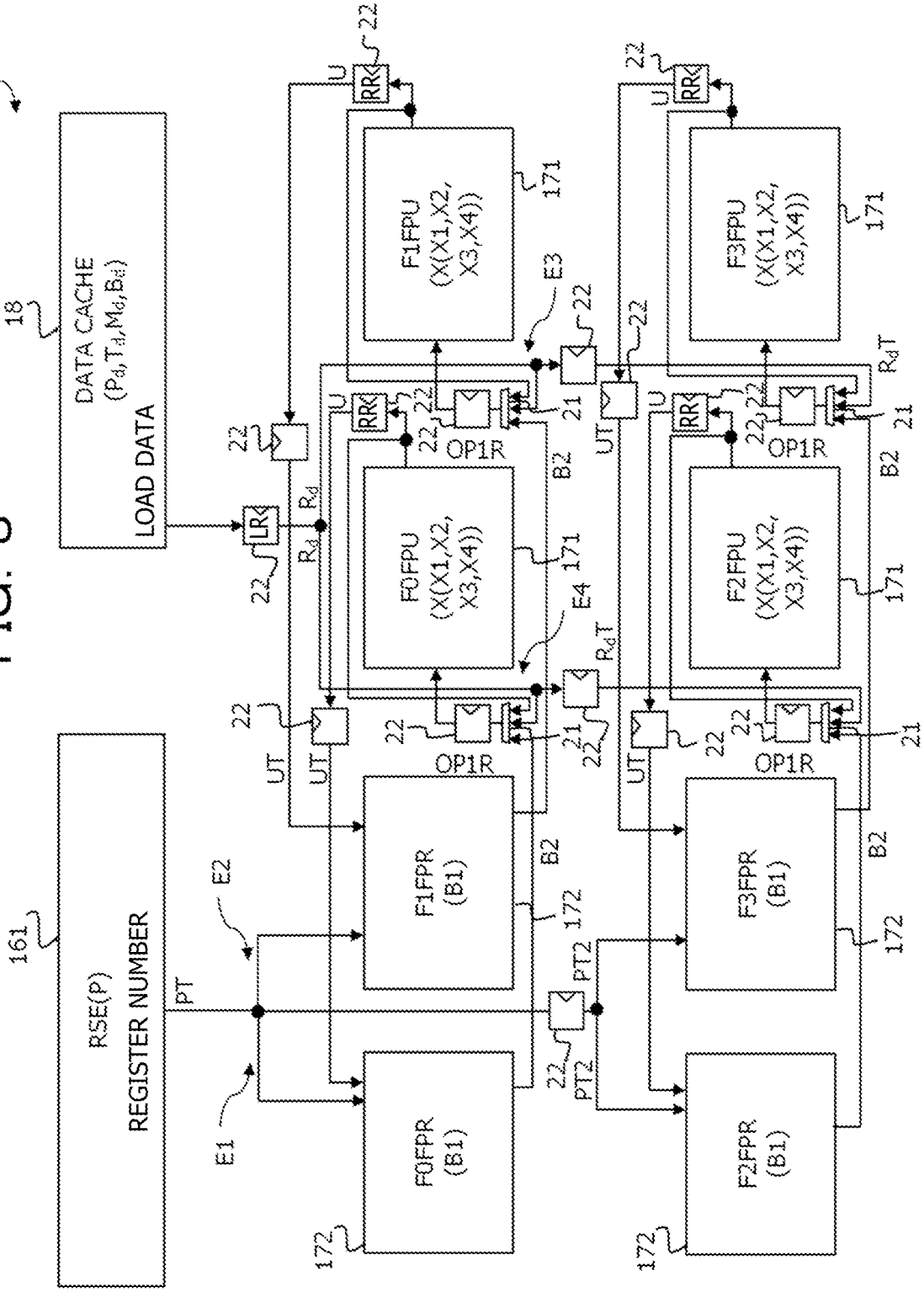
FIG. 8 is a block diagram explaining an arrangement example of an RSE, an FPR, an FPU, and a DATA cache in an embodiment.

FIG. 8 is a block diagram explaining an arrangement example of an RSE 161, an FPR 172, an FPU 171, and a DATA cache 18 in the embodiment.

As illustrated in FIG. 8, compared with the arrangement of the related example illustrated in FIGS. 5 and 6, the arrangement is changed in such a manner that the FPR 172 is shifted to the RSE 161 side, in other words, the FPR 172 is arranged at near the RSE 161, and the FPU 171 is shifted to the DATA cache 18 side, in other words, the FPU 171 is arranged at near the DATA cache 18. A PT2 cycle in which a register number is transferred from the RSE 161 to the FPR 172 of F01 is deleted (see reference signs E1 and E2), and a cycle RdT in which load data is transferred from the DATA cache 18 to the FPU 171 of F01 is also deleted (reference signs E3 and E4).

In FIG. 8 and the subsequent drawings, a reference sign 21 denotes a selector, and a reference sign 22 denotes a flip-flop.

For example, the RSE 161 stores an arithmetic instruction. The data cache 18 caches a calculation result of an arithmetic instruction. Each of a plurality of the FPRs 172 is arranged on the RSE 161 side and stores a register value used for executing an arithmetic instruction transferred from the RSE 161. Each of a plurality of the FPUs 171 is arranged on the DATA cache 18 side and performs a floating point operation based on an arithmetic instruction. The number of cycles is one when a register value is transferred from the RSE 161 to one or more FPRs 172 arranged in the positions closest in distance to the RSE 161 among the plurality of FPRs 172.

FIG. 9 is a time chart of an arithmetic instruction and a load instruction in a case where only an F01 lane is used in the related example and the embodiment.

As illustrated in the time chart of FIG. 9, in the embodiment, the latency of the instruction using only the F01 may be improved by one cycle in both the arithmetic instruction and the load instruction as compared with the related example (see reference signs F1 and F2).

With this, the FPR 172 is released earlier, which makes it possible to obtain an effect of lowering a probability that the pipeline is stalled due to a shortage of the FPRs 172. The probability that the pipeline is stalled may be lowered by increasing the number of FPRs 172, but there arises a risk of an increase in the amount of hardware and an increase in power consumption.

FIG. 10 is a time chart of an arithmetic instruction and a load instruction in a case where an F23 lane is also used in the related example and the embodiment.

As illustrated in FIG. 10, regarding the instructions also using the F23, the number of cycles of the F01 differs from that of the F23 in both the arithmetic instruction and the load instruction as compared with the related example (see reference signs G1 and G2), but a difference of each element in the timing control of a P cycle does not have to be considered.

Figure 11:
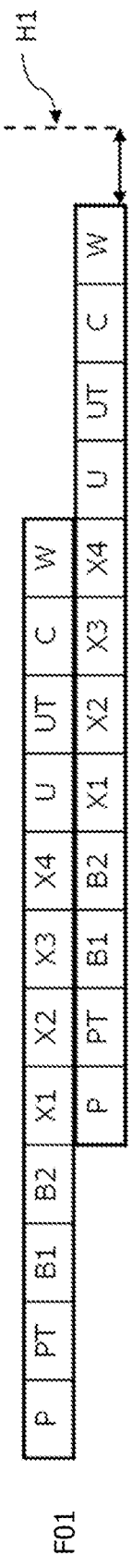
FIG. 11 is a bypass time chart illustrating processing from an arithmetic instruction to another arithmetic instruction in a case where only the F01 lane is used in the related example and the embodiment.

FIG. 11 is a bypass time chart illustrating processing from an arithmetic instruction to another arithmetic instruction in a case where only the F01 lane is used in the related example and the embodiment. FIG. 12 is a bypass time chart illustrating processing from an arithmetic instruction to another arithmetic instruction in a case where the F23 lane is also used in the related example and the embodiment.

In the examples of the bypass from the arithmetic instruction to the other arithmetic instruction as illustrated in FIGS. 11 and 12, the calculation completion in the F01 is shortened by one cycle in the embodiment as compared with the related example (see reference sign H1). On the other hand, the P cycle timings of the subsequent instructions as bypass destinations are coincident with each other between the F01 and F23 (see reference sign I1), and therefore the timing control of the bypass does not have to be changed.

Figure 13:
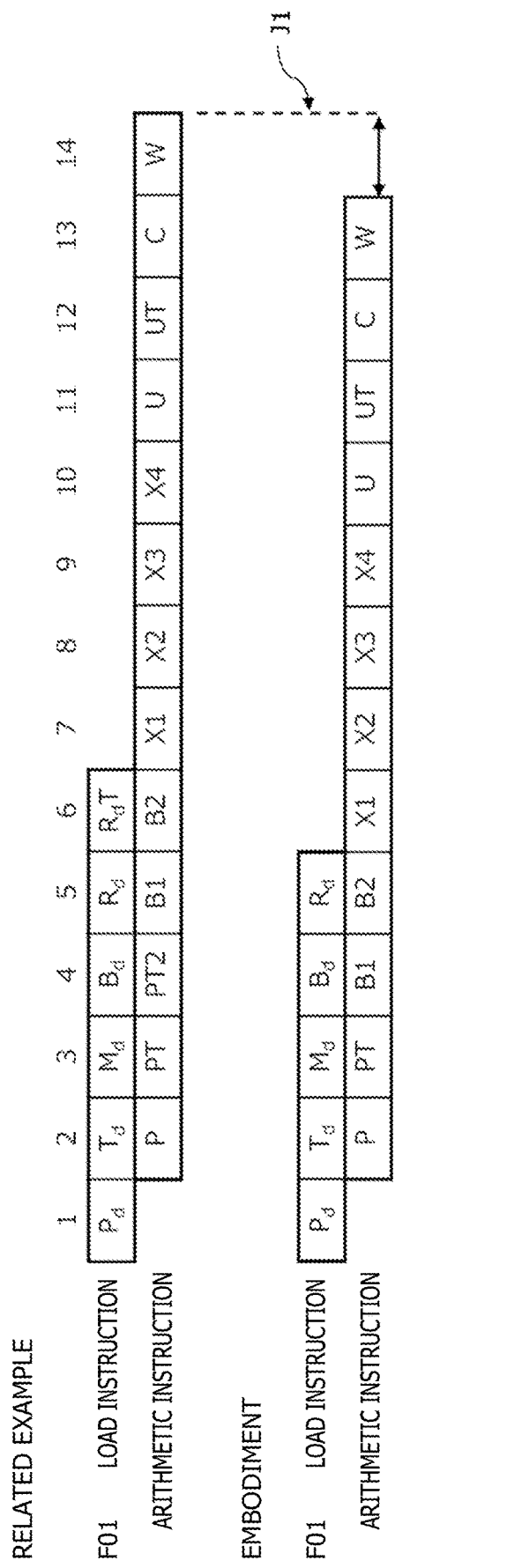
FIG. 13 is a bypass time chart illustrating processing from a load instruction to an arithmetic instruction in a case where only the F01 lane is used in the related example and the embodiment.

FIG. 13 is a bypass time chart illustrating processing from a load instruction to an arithmetic instruction in a case where only the F01 lane is used in the related example and the embodiment. FIG. 14 is a bypass time chart illustrating processing from a load instruction to an arithmetic instruction in a case where the F23 lane is also used in the related example and the embodiment.

A bypass from a load instruction to an arithmetic instruction as illustrated in FIGS. 13 and 14 is similar to the bypass from the arithmetic instruction to the other arithmetic instruction illustrated in FIGS. 11 and 12. As illustrated in FIG. 13, the completion of the instruction using only the F01 is shortened by one cycle as compared with the related example (see reference sign J1). As illustrated in FIG. 14, although there is a shift of one cycle between the F01 and F23 in the instruction also using the F23, the P cycle timings of the subsequent instructions as bypass destinations are coincident with each other between the F01 and F23 (see reference sign Ki), and therefore the timing control of the bypass does not have to be changed.

According to the embodiment, not only in the case where the time difference between the elements is one cycle and two stages, but also in a case where a SIMD width is widened to cause the time difference between the elements to be two cycles, three or more stages, or the like, the implementation may be carried out in a similar manner in the P cycle timing control without considering the difference of each element.

Figure 15:
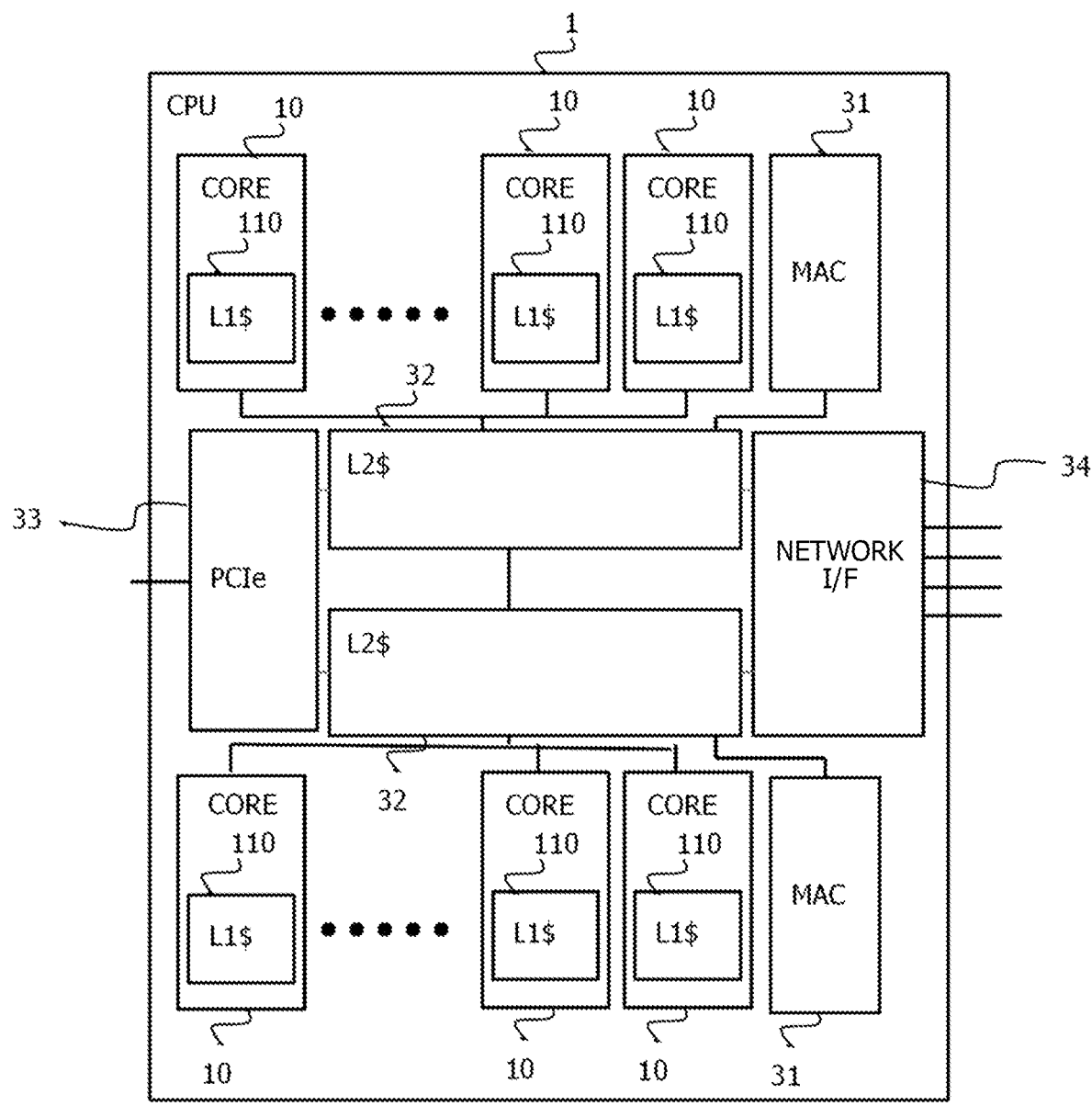
FIG. 15 is a block diagram schematically illustrating a configuration example of a CPU in the embodiment.

FIG. 15 is a block diagram schematically illustrating a configuration example of a CPU 1 in the embodiment.

The CPU 1 is an example of a processor. Inside the CPU 1, there is a core 10, in which an instruction issuing unit (not illustrated in FIG. 15), a calculation unit (not illustrated in FIG. 15), an L1 cache (L1$) 110 holding data nearby, and the like are combined. The CPU 1 includes a memory access controller (MAC) 31, an L2 cache (L2$) 32, a Peripheral Component Interconnect Express (PCIe) 33, and a network IF 34. A server, high-performance computing (HPC), or the like may have a plurality of the CPUs 1 coupled to each other to increase the processing speed.

A plurality of the cores 10 is each in charge of independent processing, and shares the L2 cache 32 having a larger capacity than the L1 cache 110.

The MAC 31 is an interface configured to control communications with an external memory such as a dual inline memory module (DIMM) or the like.

The PCIe 33 is coupled to I/O of a storage, a host computer, or the like.

The network IF 34 is an interconnect configured to couple the plurality of CPUs 1 to each other.

The CPU 1 may have a hardware configuration example similar to that of the related example illustrated in FIG. 1.

Figure 16:
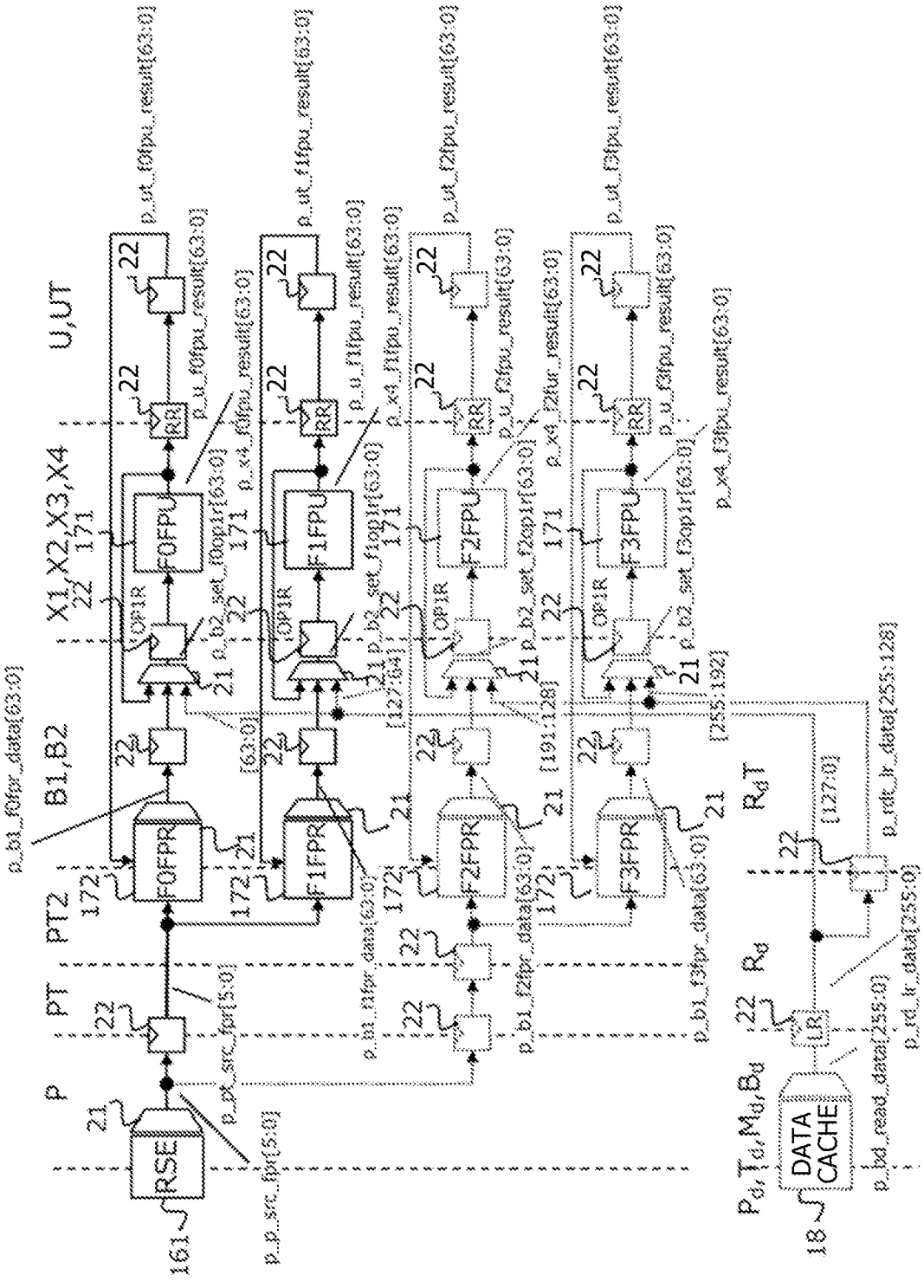
FIG. 16 is a bypass block diagram from an arithmetic instruction to another arithmetic instruction using only two elements (F0 and F1) in the embodiment.
Figure 17:
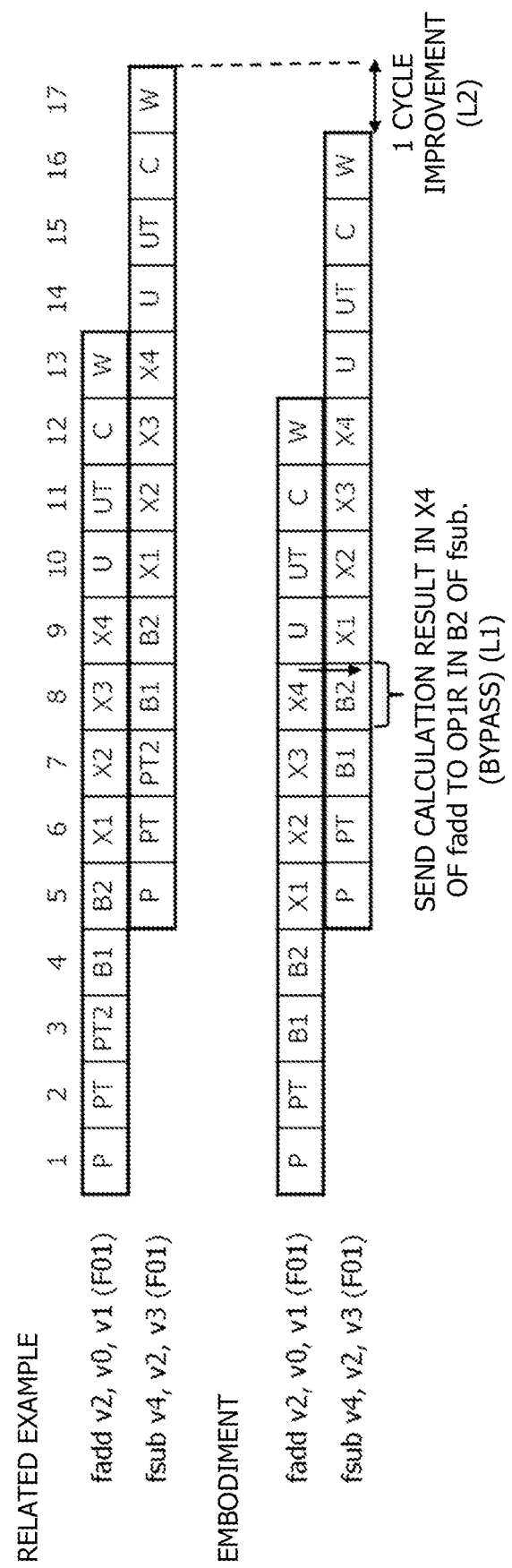
FIG. 17 is a bypass time chart from an arithmetic instruction to another arithmetic instruction using only two elements (F0 and F1) in the related example and the embodiment.
Figure 18:
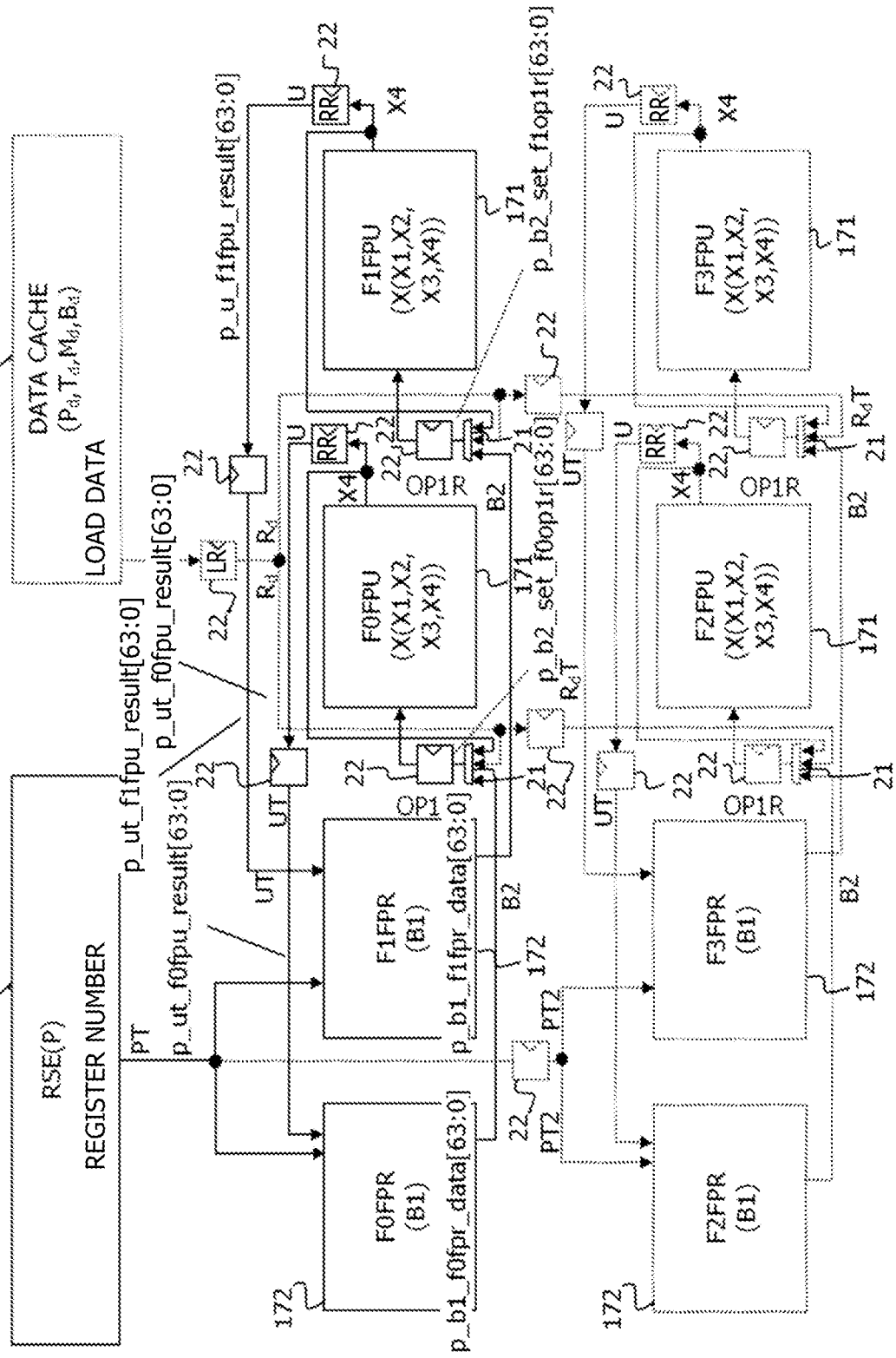
FIG. 18 is a block diagram illustrating a bypass arrangement example from an arithmetic instruction to another arithmetic instruction using only two elements (F0 and F1) in the embodiment.

FIG. 16 is a bypass block diagram from an arithmetic instruction to another arithmetic instruction using only two elements (F0 and F1) in the embodiment. FIG. 17 is a bypass time chart from an arithmetic instruction to another arithmetic instruction using only two elements (F0 and F1) in the related example and the embodiment. FIG. 18 is a block diagram illustrating a bypass arrangement example from an arithmetic instruction to another arithmetic instruction using only two elements (F0 and F1) in the embodiment.

In the examples illustrated in FIGS. 16 to 18, among the four FPRs 172 and four FPUs 171, the F0FPR and F1FPR, and the F0FPU and F1FPU are used.

As illustrated in FIG. 17, two arithmetic instructions are fadd v2, v0, v1 and fsub v4, v2, v3. P, PT, B1, B2, X1, X2, X3, X4, U, UT, C, and W illustrated in FIGS. 16 to 18 each indicate a cycle name of pipeline processing of the arithmetic instructions.

First, in the P cycle, a register number (p_p_src_fpr[5:0]) is sent from the RS toward the FPR 172 of each element, and the register number is transferred to the F0FPR and F1FPR of each element (p_pt_src_fpr[5:0]) by taking one cycle of PT.

In the subsequent B1 cycle, the value of the FPR 172 corresponding to the transferred register number is read out (p_b1_f{0-1}fpr_data[63:0]), and in the B2 cycle, the value is set (p_b2_set_f{0-1}op1r[63:0]) in the flip-flop 22 indicated by OP1R (register that holds an operand).

At this time, in a case where a calculation result of the previous instruction is reused without waiting for the writing of U and UT into the FPR 172, a calculation result of the FPU 171 in the X4 cycle is set in the flip-flop 22 indicated by OP1R in the B2 cycle (bypass; see reference sign L1 in FIG. 17).

In the X1, X2, X3, and X4 cycles, calculations are simultaneously executed in the F0FPU and F1FPU, and the result is set (p_x4_f{0-1}fpu_result[63:0]) in the flip-flop 22 indicated by result register (RR: a register that holds the calculation result) in the X4 cycle, which is the last cycle.

Then, in the U and UT cycles, the calculation result is transferred to the F0FPR and F1FPR to be written (p_u_f{0-1}fpu_result, and p_ut_f{0-1}fpu_result).

In the C and W cycles (see FIG. 17), the instructions having been executed in the out-of-order mode are completed in the original execution order of the program, and the resources of various registers such as the FPR 172, memories, and the like are updated and released.

Each of v0, v1, v2, v3, and v4 in a sequence of instructions is a 128-bit register corresponding to the SIMD operation, and is able to process two elements (F0 and F1) in parallel while using 64 bits as one element. Both the fadd instruction and the fsub instruction use the v2 register, and the calculation result of the fadd instruction is reused in the fsub instruction. When the fsub instruction attempts to receive input data from the FPR 172, it is to allow some time until the UT cycle in which the fadd instruction writes the calculation result into the FPR 172. However, by sending the calculation result in the X4 cycle of the fadd instruction (p_x4_f{0-1}fpu_result[63:0]) as it is to OP1R in the B2 cycle (p_b2_set_f{0-1}op1r[63:0]), the calculation may be performed without waiting for the update of the FPR 172.

As illustrated in FIG. 18, to execute the arithmetic instruction, one or more FPRs 172 arranged in the positions closest in distance to the RSE 161 among the plurality of FPRs 172 may be used, and one or more FPUs 171 arranged in the positions closest in distance to the DATA cache 18 among the plurality of FPUs 171 may be used.

As illustrated in FIG. 17, while the register number transfer cycle in the related example includes two cycles of PT and PT2, the embodiment includes only one cycle of PT, and thus the latency is improved by one cycle as compared with the related example (see reference sign L2 in FIG. 17).

The latency improvement shortens the period of time until the FPR 172 is released in the W cycle. As a result, there are exhibited effects of suppressing a situation in which the shortage of the FPRs 172 causes the pipeline to stall and hinders the performance enhancement, suppressing an increase in power consumption, an increase in a chip area, or the like due to the increase of the number of entries of the FPRs 172 to be free from the shortage of the FPRs 172, and the like.

Figure 19:
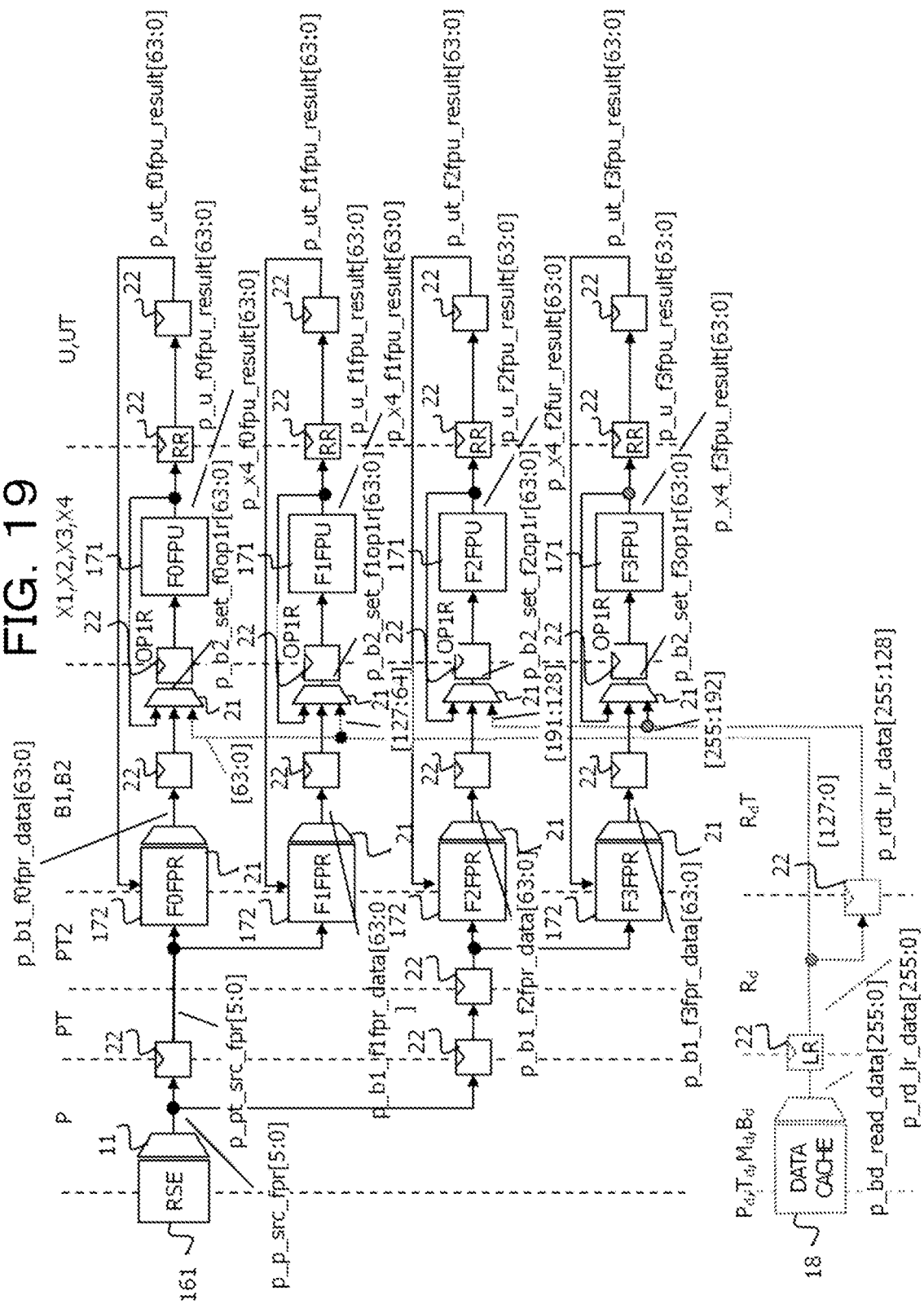
FIG. 19 is a bypass block diagram from an arithmetic instruction to another arithmetic instruction using all four elements (F0, F1, F2, and F3) in the embodiment.
Figure 21:
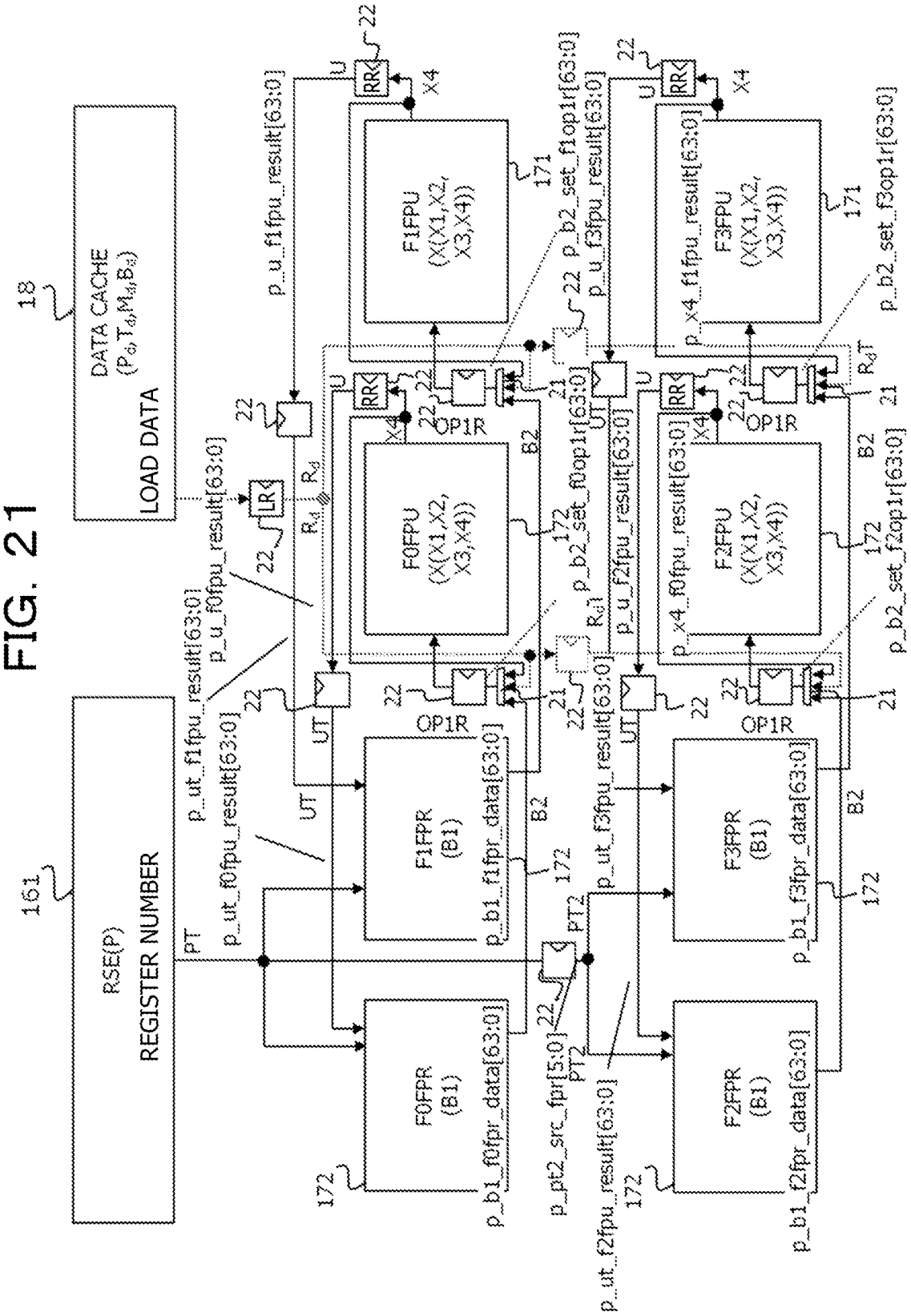
FIG. 21 is a block diagram illustrating a bypass arrangement example from an arithmetic instruction to another arithmetic instruction using all four elements (F0, F1, F2, and F3) in the embodiment.

FIG. 19 is a bypass block diagram from an arithmetic instruction to another arithmetic instruction using all four elements (F0, F1, F2, and F3) in the embodiment. FIG. 20 is a bypass time chart from an arithmetic instruction to another arithmetic instruction using all four elements (F0, F1, F2, and F3) in the related example and the embodiment. FIG. 21 is a block diagram illustrating a bypass arrangement example from an arithmetic instruction to another arithmetic instruction using all four elements (F0, F1, F2, and F3) in the embodiment.

In the examples illustrated in FIGS. 19 to 21, among the four FPRs 172 and four FPUs 171, all of the F0FPR, F1FPR, F2FPR, and F3FPR, and all of the F0FPU, F1FPU, F2FPU, and F3FPU are used.

As illustrated in FIG. 20, two arithmetic instructions are fadd z2, z0, z1 and fsub z4, z2, z3.

P, PT, PT2, B1, B2, X1, X2, X3, X4, U, UT, C, and W illustrated in FIGS. 19 to 21 each indicate a cycle name of pipeline processing of the arithmetic instructions.

First, in the P cycle, a register number is sent from the RS toward the FPR 172 of each element (p_p_src_fpr[5:0]), the register number is transferred to the F0FPR and F1FPR by taking one cycle of PT (p_pt_src_fpr[5:0]), and the register number is transferred to the F2FPR and F3FPR by taking two cycles of PT and PT2 (p_pt2_src_fpr[5:0]).

In the subsequent B1 cycle, the value of the FPR 172 corresponding to the transferred register number is read out (p_b1_f{0-3}fpr_data[63:0]), and in the B2 cycle, the value is set (p_b2_set_f{0-1}op1r[63:0]) in the flip-flop 22 indicated by OP1R (register that holds an operand).

At this time, in a case where a calculation result of the previous instruction is reused without waiting for the writing of U and UT into the FPR 172, a calculation result of the FPU 171 in the X4 cycle is set in the flip-flop 22 indicated by OP1R in the B2 cycle (bypass; see reference sign M1 in FIG. 20).

In the X1, X2, X3, and X4 cycles, the FPU 171 of each element (F0FPU, F1FPU, F2FPU, and F3FPU) simultaneously executes calculation, and in the X4 cycle, which is the last cycle, the calculation result is set in the flip-flop 22 indicated by result register (RR: a register that holds the calculation result) (p_x4_f{0-3}fpu_result[63:0]).

Then, in the U and UT cycles, the calculation result is transferred to the FPR 172 of each element (F0FPR, F1FPR, F2FPR, and F3FPR) to be written (p_u_f{0-3}fpu_result and p_ut_f{0-3}fpu_result).

In the C and W cycles (see FIG. 20), the instructions having been executed in the out-of-order mode are completed in the original execution order of the program, and the resources of various registers such as the FPR 172, memories, and the like are updated and released.

Each of z0, z1, z2, z3, and z4 in a sequence of instructions is a 256-bit register corresponding to the SIMD operation, and is able to process four elements (F0, F1, F2, and F3) in parallel while using 64 bits as one element. Both the fadd instruction and the fsub instruction use the z2 register, and the calculation result of the fadd instruction is reused in the fsub instruction.

When the fsub instruction attempts to receive input data from the FPR 172, it is to allow some time until the UT cycle in which the fadd instruction writes the calculation result into the FPR 172. However, by the calculation result in the X4 cycle of the fadd instruction (p_x4_f{0-3}fpu_result[63:0]) being sent as it is to OP1R in the B2 cycle (p_b2_set_f{0-1}op1r[63:0]), the calculation may be performed without waiting for the update of the FPR 172.

Unlike the case illustrated in FIGS. 16 to 18, since the instructions in the present case use all the elements (F0, F1, F2, and F3), the register number transfer cycles of F2 and F3 are not changed from the two cycles of PT and PT2 as compared with the related example, and therefore there is no improvement in the latency (see reference sign M2 in FIG. 20).

Note that, however, the F0 and F1 carry out the transfer only in the PT cycle, and the F2 and F3 carry out the transfer in two cycles of PT and PT2, there is a time difference between the elements. However, as illustrated in the time chart of FIG. 20, the timings of the P cycles in the F01 and F23 of the subsequent instructions as bypass destinations coincide with each other, and thus there is an advantage that the difference of each element does not have to be considered in the bypass timing control.

As in the embodiment, not only in the case where the time difference between the elements is one cycle and two stages, but also in a case where the SIMD width is widened to cause the time difference between the elements to be two cycles, three or more stages, or the like, the implementation may be carried out in a similar manner in the P cycle timing control without considering the difference of each element.

Figure 22:
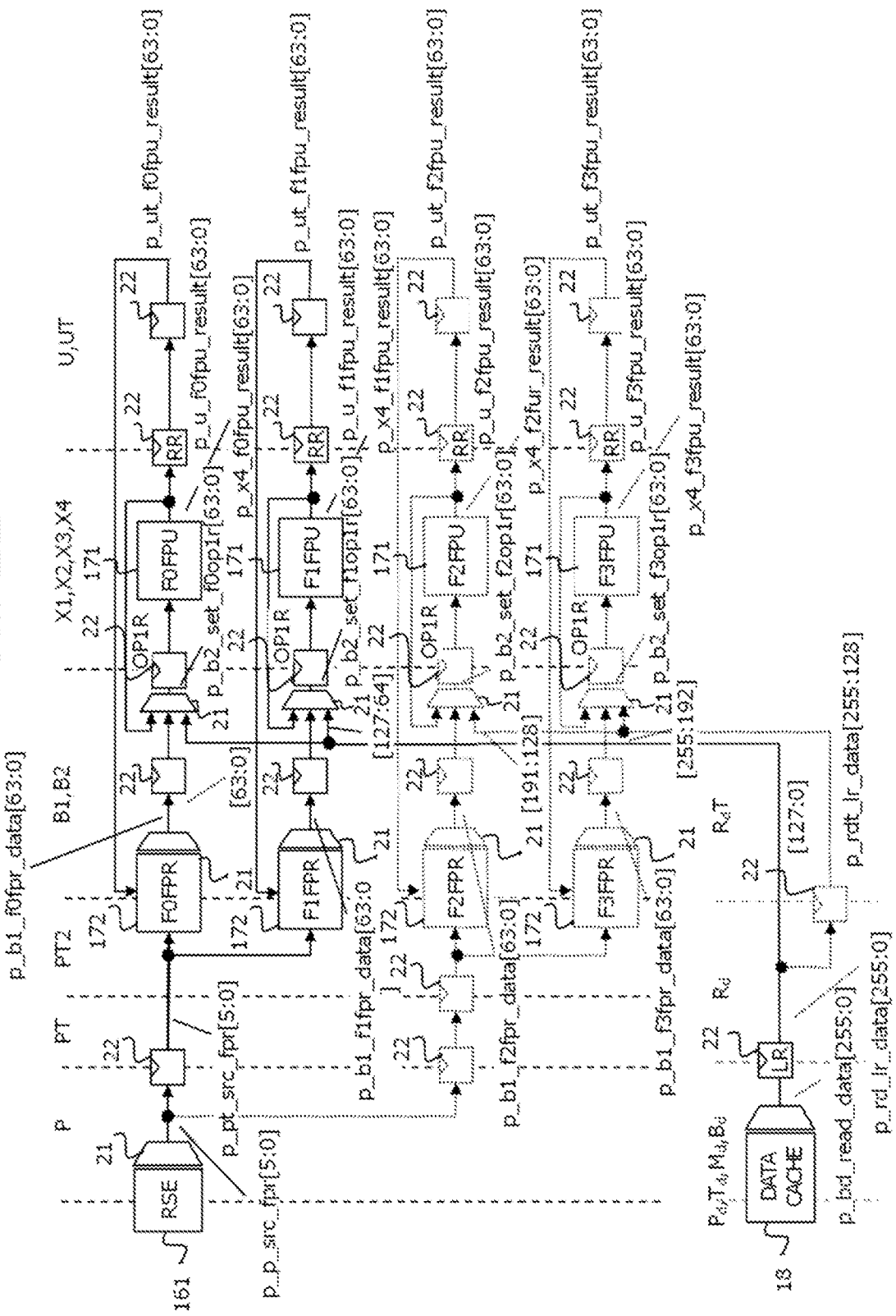
FIG. 22 is a bypass block diagram from a load instruction to an arithmetic instruction using only two elements (F0 and F1)
Figure 24:
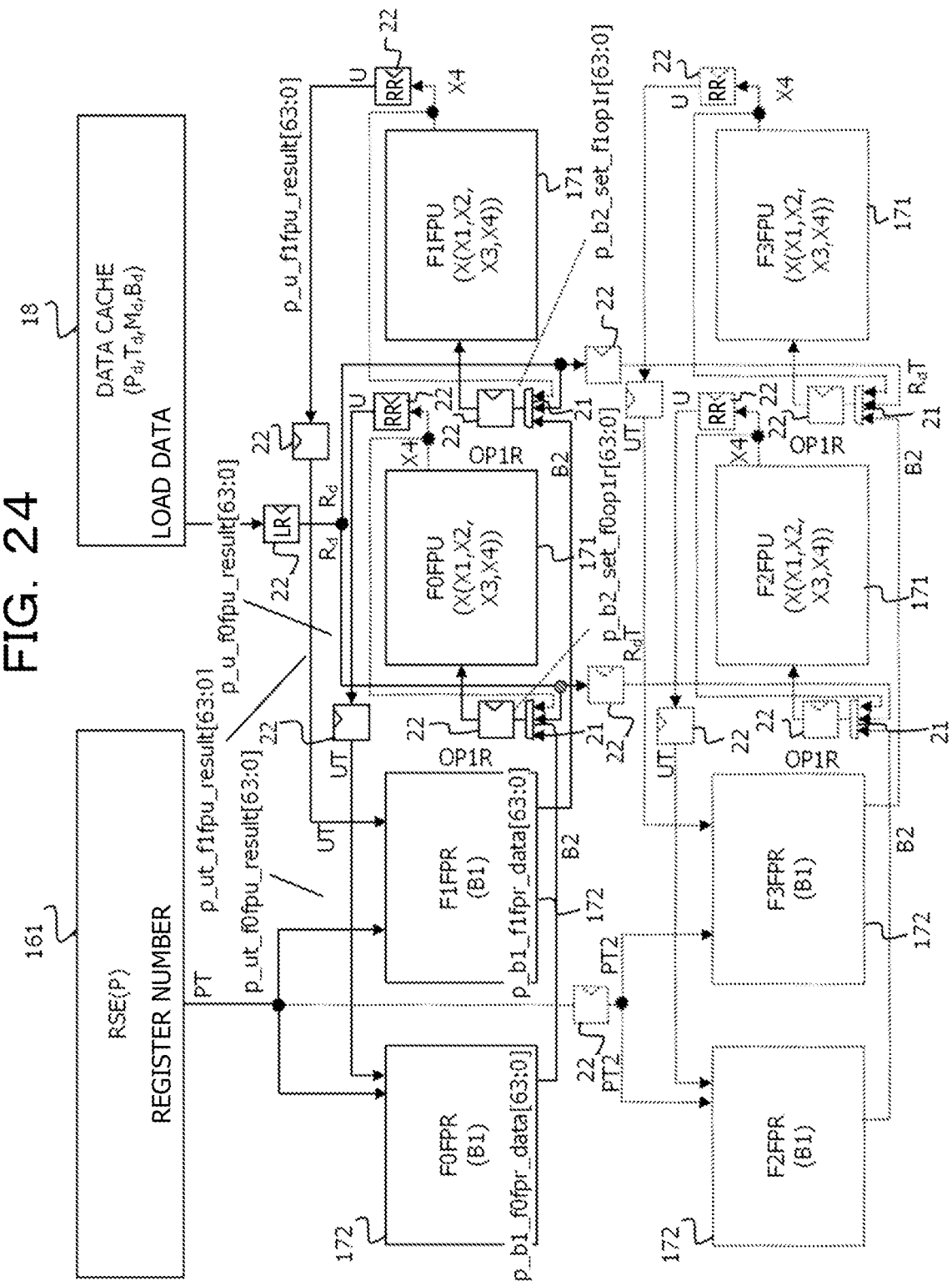
FIG. 24 is a block diagram illustrating a bypass arrangement example from a load instruction to an arithmetic instruction using only two elements (F0 and F1) in the embodiment.

FIG. 22 is a bypass block diagram from a load instruction to an arithmetic instruction using only two elements (F0 and F1). FIG. 23 is a bypass time chart from a load instruction to an arithmetic instruction using only two elements (F0 and F1) in the related example and the embodiment. FIG. 24 is a block diagram illustrating a bypass arrangement example from a load instruction to an arithmetic instruction using only two elements (F0 and F1) in the embodiment.

In the examples illustrated in FIGS. 22 to 24, among the four FPRs 172 and four FPUs 171, the F0FPR and F1FPR, and the F0FPU and F1FPU are used.

As illustrated in FIG. 23, the load instruction is Idr v2, [x0, x1], and the arithmetic instruction is fsub v4, v2, v3.

In FIG. 22 to FIG. 24, Pd, Td, Md, Bd, and Rd each indicate a cycle name of pipeline processing of the load instruction.

In the Pd cycle, the address sent from the address calculation unit is sent to the DATA cache 18, and in the Td, Md, and Bd cycles, data of the sent address is read out and set in the flip-flop 22 indicated by LR (p_bd_read_data[127:0]). In the Rd cycle, [63:0] of the data (p_rd_lr_data[127:0]) in the flip-flop 22 indicated by LR is transferred to the flip-flop 22 indicated by OP1R in the F0FPU, and [127:64] thereof is transferred to the flip-flop 22 indicated by OP1R in the F1FPU.

In FIGS. 22 to 24, P, PT, B1, B2, X1, X2, X3, X4, U, UT, C, and W each indicate a cycle name of pipeline processing of the arithmetic instructions.

First, in the P cycle, a register number is sent (p_p_src_fpr[5:0]) from the RS toward the FPR 172 of each element, and the register number is transferred to the F0FPR and F1FPR of each element (p_pt_src_fpr[5:0]) by taking one cycle of PT.

In the subsequent B1 cycle, the value of the FPR 172 corresponding to the transferred register number is read out (p_b1_f{0-1}fpr_data[63:0]), and in the B2 cycle, the value is sent (p_b2_set_f{0-1}op1r[63:0]) to the flip-flop 22 indicated by OP1R (register that holds an operand) (bypass; see reference sign N1 in FIG. 23).

In the X1, X2, X3, and X4 cycles, calculations are simultaneously executed in the F0FPU and F1FPU of each element, and the result is set (p_x4_f{0-1}fpu_result[63:0]) in the flip-flop 22 indicated by result register (RR: a register that holds the calculation result) in the X4 cycle, which is the last cycle.

In the U and UT cycles, the calculation result is transferred to the F0FPR and F1FPR to be written (p_u_f{0-1}fpu_result and p_ut_f{0-1}fpu_result).

For example, the RS may further store a load instruction or a store instruction. After the load instruction or the store instruction is executed, the arithmetic instruction may be executed. The load instruction or the store instruction may be stored in an RSA (corresponding to the RSA 662 of the related example illustrated in FIG. 1) included in the RS.

In the C and W cycles (see FIG. 23), the instructions having been executed in the out-of-order mode are completed in the original execution order of the program, and the resources of various registers such as the FPR 172, memories, and the like are updated and released.

Each of v2, v3, and v4 in a sequence of instructions is a 128-bit register corresponding to the SIMD operation, and is able to process two elements (F0 and F1) in parallel while using 64 bits as one element. Note that x0 and x1 are 64-bit fixed point registers, and are used for address calculation in this case. In the case of this Idr instruction, 128-bit data is loaded from an address of (x0+x1) every 64 bits into each of the F0FPR and the F1FPR. Both the Idr instruction and the fsub instruction use the v2 register, and the data loaded by the Idr instruction is reused by the fsub instruction. When the fsub instruction attempts to receive input data from the FPR 172, it is to allow some time until the Idr instruction writes the result into the FPR 172. However, since the loaded data is directly sent from the Rd cycle (p_rd_lr_data[127:0]) to OP1R of the B2 cycle (p_b2_set_f{0-1}op1r[63:0]), the calculation may be performed without waiting for the update of the FPR 172.

As in the case illustrated in FIGS. 16 to 18, while the register number transfer cycle in the related example includes two cycles of Rd and RdT, the embodiment includes only one cycle of Rd, and thus the latency is improved by one cycle as compared with the related example (see reference sign N1 in FIG. 23).

The latency improvement shortens the period of time until the FPR 172 is released in the W cycle, which suppresses a situation in which the shortage of the FPRs 172 causes the pipeline to stall and hinders the performance enhancement. In addition, there is exhibited an effect of suppressing an increase in power consumption, an increase in a chip area, or the like due to the increase of the number of entries of the FPRs 172 to be free from the shortage of the FPRs 172.

Figure 25:
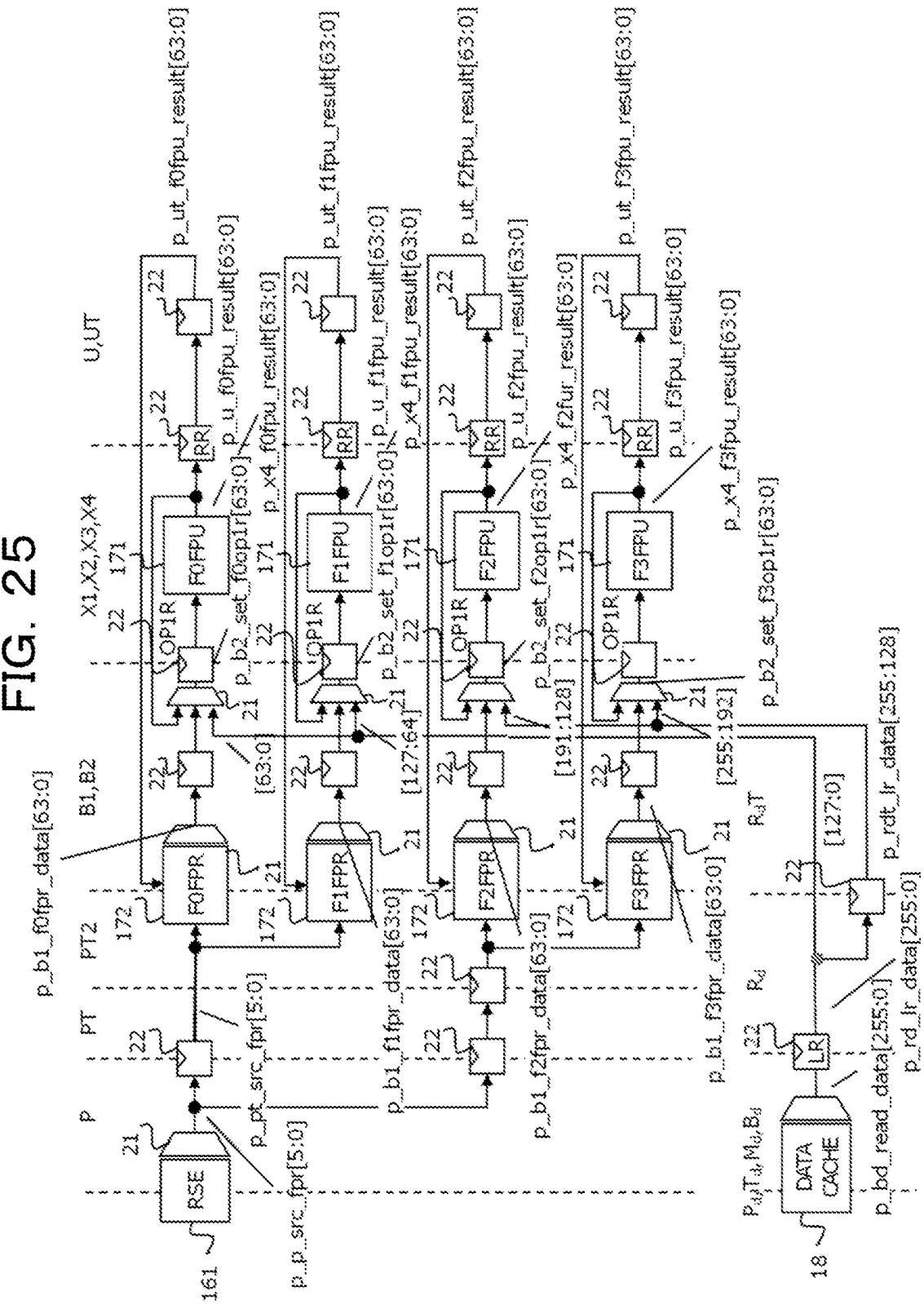
FIG. 25 is a bypass block diagram from a load instruction to an arithmetic instruction using all four elements (F0, F1, F2, and F3) in the embodiment.
Figure 27:
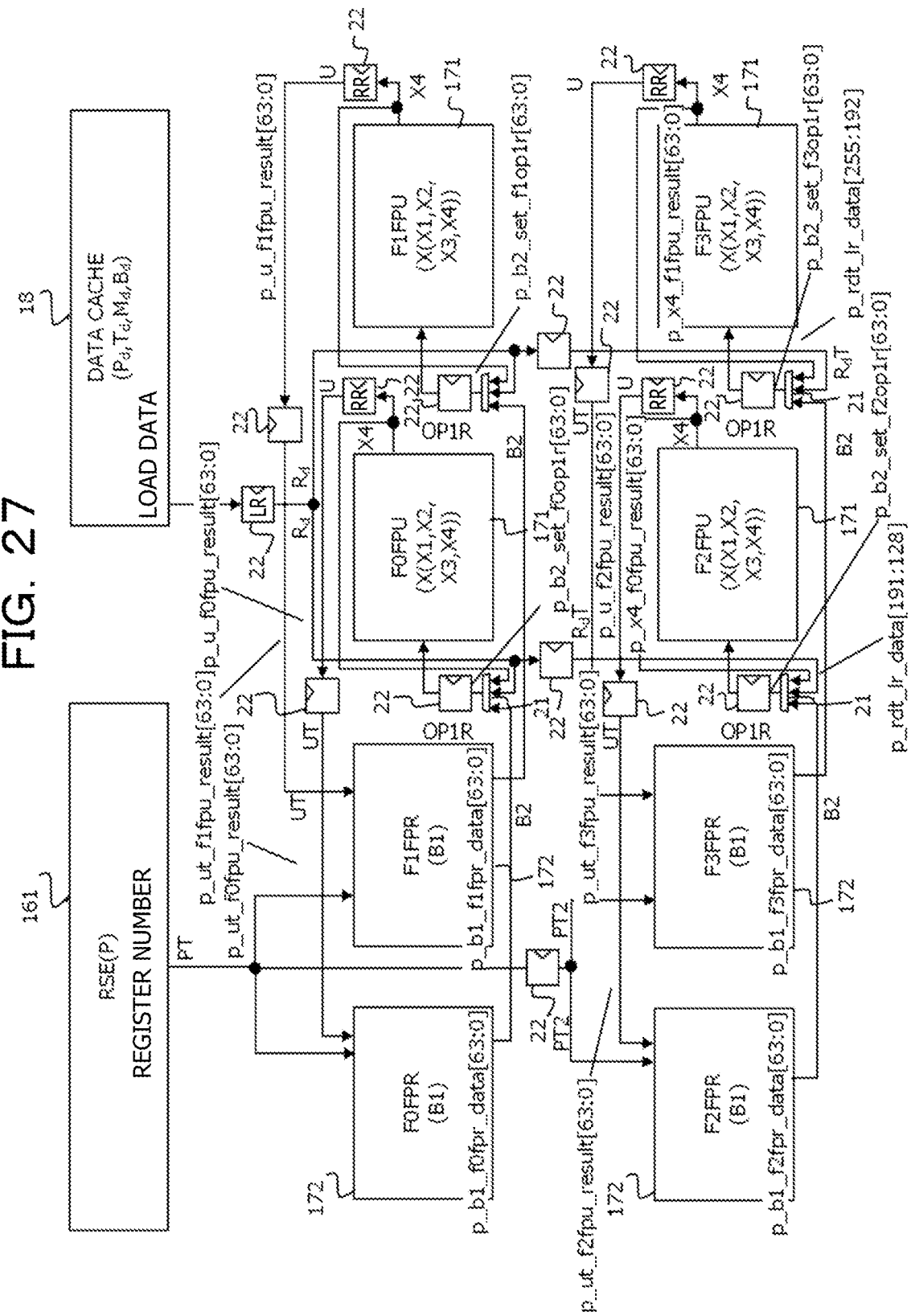
FIG. 27 is a block diagram illustrating a bypass arrangement example from a load instruction to an arithmetic instruction using all four elements (F0, F1, F2, and F3) in the embodiment.

FIG. 25 is a bypass block diagram from a load instruction to an arithmetic instruction using all four elements (F0, F1, F2, and F3) in the embodiment. FIG. 26 is a bypass time chart from a load instruction to an arithmetic instruction using all four elements (F0, F1, F2, and F3) in the related example and the embodiment. FIG. 27 is a block diagram illustrating a bypass arrangement example from a load instruction to an arithmetic instruction using all four elements (F0, F1, F2, and F3) in the embodiment.

In the examples illustrated in FIGS. 25 to 27, among the four FPRs 172 and four FPUs 171, all of the F0FPR, F1FPR, F2FPR, and F3FPR, and all of the F0FPU, F1FPU, F2FPU, and F3FPU are used.

As illustrated in FIG. 26, the load instruction is Idr z2, [x0, x1], and the arithmetic instruction is fsub z4, z2, z3.

Pd, Td, Md, Bd, Rd, and RdT illustrated in FIGS. 25 to 27 each indicate a cycle name of pipeline processing of the load instruction.

In the Pd cycle, an address sent from the address calculation unit is sent to the DATA cache 18.

In the Td, Md, and Bd cycles, the data of the sent address is read out and set in the flip-flop 22 indicated by LR (p_bd_read_data[255:0]). Of the data in the flip-flop 22 indicated by LR, [63:0] is transferred taking one cycle of Rd to the flip-flop 22 indicated by OP1R in the F0FPU, and [127:64] is transferred taking one cycle of Rd to the flip-flop 22 indicated by OP1R in the F1FPU.

Taking two cycles of Rd and RdT, [191:128] is transferred to the flip-flop 22 indicated by OP1R in the F2FPU, and [255:192] is transferred to the flip-flop 22 indicated by OP1R in the F3FPU.

P, PT, PT2, B1, B2, X1, X2, X3, X4, U, UT, C, and W illustrated in FIGS. 25 to 27 each indicate a cycle name of pipeline processing of the arithmetic instructions.

First, in the P cycle, a register number is sent from the RS toward the FPR 172 of each element (p_p_src_fpr[5:0]), the register number is transferred to the F0FPR and F1FPR by taking one cycle of PT (p_pt_src_fpr[5:0]), and the register number is transferred to the F2FPR and F3FPR by taking two cycles of PT and PT2 (p_pt2_src_fpr[5:0]).

In the subsequent B1 cycle, the value of the FPR 172 corresponding to the transferred register number is read out (p_b1_f{0-3}fpr_data[63:0]), and in the B2 cycle, the value is set (p_b2_set_f{0-1}op1r[63:0]) in the flip-flop 22 indicated by OP1R (register that holds an operand).

At this time, in a case where a calculation result of the previous instruction is reused without waiting for the writing of U and UT into the FPR 172, a calculation result of the FPU 171 in the X4 cycle is set in the flip-flop 22 indicated by OP1R in the B2 cycle (bypass; see reference sign P1 in FIG. 26).

In the X1, X2, X3, and X4 cycles, the FPU 171 of each element (F0FPU, F1FPU, F2FPU, and F3FPU) simultaneously executes calculation, and in the X4 cycle, which is the last cycle, the calculation result is set in the flip-flop 22 indicated by result register (RR: a register that holds the calculation result) (p_x4_f{0-3}fpu_result[63:0]).

In the U and UT cycles, the calculation result is transferred to the FPR 172 of each element (F0FPR, F1FPR, F2FPR, and F3FPR) to be written (p_u_f{0-3}fpu_result and p_ut_f{0-3}fpu_result).

In the C and W cycles (see FIG. 26), the instructions having been executed in the out-of-order mode are completed in the original execution order of the program, and the resources of various registers such as the FPR 172, memories, and the like are updated and released.

Each of z2, z3, and z4 in a sequence of instructions is a 256-bit register corresponding to the SIMD operation, and is able to process four elements (F0, F1, F2, and F3) in parallel while using 64 bits as one element. Note that x0 and x1 are 64-bit fixed point registers, and are used for address calculation in this case. In the case of this ldr instruction, 256-bit data is loaded from an address of (x0+x1) every 64 bits into each of the F0FPR, F1FPR, F2FPR, and F3FPR. Both the ldr instruction and the fsub instruction use the z2 register, and the data loaded by the ldr instruction is reused by the fsub instruction. When the fsub instruction attempts to receive input data from the FPR 172, it is to allow some time until the ldr instruction writes the result into the FPR 172. However, since the F01 sends the loaded data from the Rd cycle (p_rd_lr_data[127:0]) and the F23 sends the loaded data from the RdT cycle (p_rdt_lr_data[255:128]) directly to OP1R of the B2 cycle (p_b2_set_{0-3}op1r[63:0]), the calculation may be performed without waiting for the update of the FPR 172.

Unlike the case illustrated in FIGS. 22 to 24, the instructions in the case illustrated in FIGS. 25 to 27 use all the elements (F0, F1, F2, and F3) and the register number transfer cycles of the F2 and F3 are not changed from the two cycles of Rd and RdT as compared with the related example, and therefore there is no improvement in the latency (see reference sign P2 in FIG. 26).

Note that the transfer in the F0 and F1 takes only the Rd cycle while the transfer in the F2 and F3 takes the two cycles of Rd and RdT, and thus there is a time difference between the elements. However, as illustrated in the time chart of FIG. 26, the timings of the P cycles in the F01 and F23 of the subsequent instructions as bypass destinations coincide with each other, and thus there is an advantage that the difference of each element does not have to be considered in the bypass timing control.

As in the embodiment, not only in the case where the time difference between the elements is one cycle and two stages, but also in a case where the SIMD width is widened to cause the time difference between the elements to be two cycles, three or more stages, or the like, the implementation may be carried out in a similar manner in the P cycle timing control without considering the difference of each element.

Figure 29:
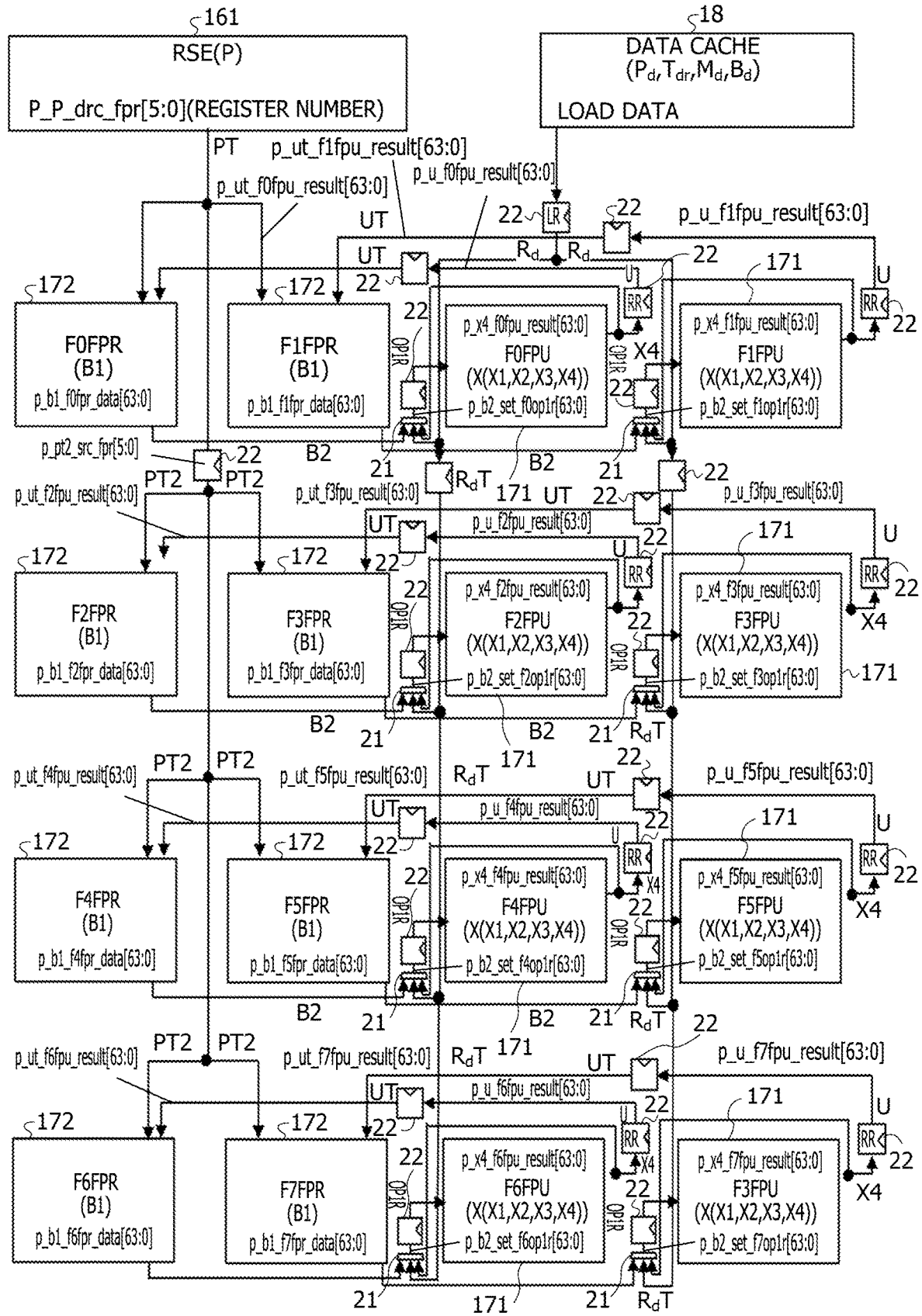
FIG. 29 is a block diagram illustrating a bypass arrangement example from an arithmetic instruction to another arithmetic instruction using all eight elements (F0 to F7) in the embodiment.

FIG. 28 is a bypass time chart from an arithmetic instruction to another arithmetic instruction using all eight elements (F0 to F7) in the related example and the embodiment. FIG. 29 is a block diagram illustrating a bypass arrangement example from an arithmetic instruction to another arithmetic instruction using all eight elements (F0 to F7) in the embodiment.

In the examples illustrated in FIGS. 28 and 29, the number of elements is increased to be eight. Among the eight FPRs 172 and eight FPUs 171, all of the F0FPR, F1FPR, F2FPR, F3FPR, F4FPR, F5FPR, F6FPR, and F7FPR, and all of the F0FPU, F1FPU, F2FPU, F3FPU, F4FPU, F5FPU, F6FPU, and F7FPU are used.

As illustrated in FIG. 28, two arithmetic instructions are fadd z2, z0, z1 and fsub z4, z2, z3.

P, PT, PT2, B1, B2, X1, X2, X3, X4, U, UT, C, and W illustrated in FIGS. 28 and 29 each indicate a cycle name of pipeline processing of the arithmetic instructions.

First, in the P cycle, a register number is sent from the RS toward the FPR 172 of each element, then the register number is transferred to the F0FPR and F1FPR by taking one cycle of PT, and the register number is transferred to the F{2-7}FPRs by taking two cycles of PT and PT2.

In the subsequent B1 cycle, the value of the FPR 172 corresponding to the transferred register number is read out to be sent to the calculation unit.

At this time, in a case where a calculation result of the previous instruction is reused without waiting for the writing of U and UT into the FPR 172, a calculation result of the FPU 171 in the X4 cycle is sent to the B2 cycle (bypass; see a reference sign Q1 in FIG. 28).

In the X1, X2, X3, and X4 cycles, calculations are simultaneously executed in the FPU 171 of each element (F{0-7}FPU), and the calculation of the X4 cycle is completed.

In the U and UT cycles, the calculation result is transferred to the FPR 172 of each element (F{0-7}FPR), and the calculation result is written therein.

In the C and W cycles (see FIG. 28), the instructions having been executed in the out-of-order mode are completed in the original execution order of the program, and the resources of various registers such as the FPR 172, memories, and the like are updated and released.

Each of z0, z1, z2, z3, and z4 in a sequence of instructions is a 512-bit register corresponding to the SIMD operation, and is able to process eight elements (F0 to F7) in parallel while using 64 bits as one element. Both the fadd instruction and the fsub instruction use the z2 register, and the calculation result of the fadd instruction is reused in the fsub instruction. When the fsub instruction attempts to receive input data from the FPR 172, it is to allow some time until the UT cycle in which the fadd instruction writes the calculation result into the FPR 172. However, by the calculation result of the fadd instruction in the X4 cycle being sent as it is to the B2 cycle, the calculation may be performed without waiting for the update of the FPR 172.

As illustrated in the time chart of FIG. 28, since the register number transfer cycles of the F2 to F7 are not changed from the two cycles of PT and PT2 as compared with the related example, there is no improvement in the latency (see reference sign Q2).

Note that there is a time difference between the elements because the F0 and F1 carry out the transfer only in the PT cycle while the F2 to F7 carry out the transfer in the two cycles of PT and PT2. However, the P cycle timings in the F01 and F2 to F7 of the subsequent instructions as bypass destinations coincide with each other, and thus there is an advantage that the difference of each element does not have to be considered in the bypass timing control.

As described above, even when the SIMD width is widened from four elements to eight elements, the implementation may be carried out in the P cycle timing control without considering the difference of each element. In the case of an instruction using only the F01, the latency is improved by one cycle as in the case of the four elements.

Figure 31:
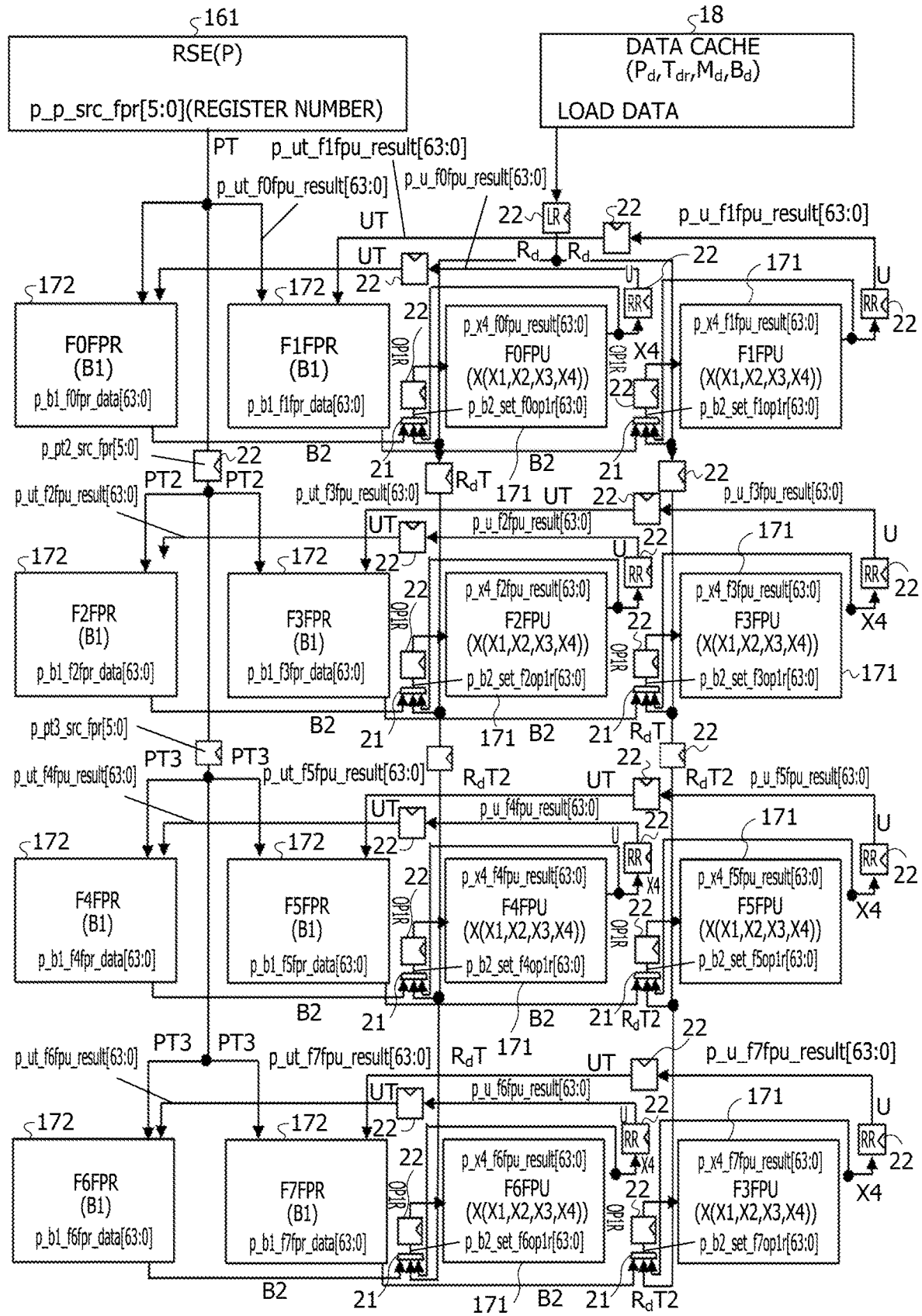
FIG. 31 is a block diagram illustrating a bypass arrangement example from an arithmetic instruction to another arithmetic instruction in a case where all eight elements (F0 to F7) are used and a time difference is set in three stages.

FIG. 30 is a bypass time chart from an arithmetic instruction to another arithmetic instruction in a case where all eight elements (F0 to F7) are used and a time difference is set in three stages in the related example and the embodiment. FIG. 31 is a block diagram illustrating a bypass arrangement example from an arithmetic instruction to another arithmetic instruction in a case where all eight elements (F0 to F7) are used and a time difference is set in three stages.

In the examples illustrated in FIGS. 30 and 31, among the eight FPRs 172 and eight FPUs 171, all of the F0FPR, F1FPR, F2FPR, F3FPR, F4FPR, F5FPR, F6FPR, and F7FPR, and all of the F0FPU, F1FPU, F2FPU, F3FPU, F4FPU, F5FPU, F6FPU, and F7FPU are used. In the examples illustrated in FIGS. 30 and 31, PT3 is requested for the transfer cycle with respect to the F4 to F7 due to restrictions on frequencies and the like, and the FPRs 172 and FPUs 171 of the eight elements are extended to be in three stages.

As illustrated in FIG. 30, two arithmetic instructions are fadd z2, z0, z1 and fsub z4, z2, z3.

P, PT, PT2, PT3, B1, B2, X1, X2, X3, X4, U, UT, C, and W illustrated in FIGS. 30 and 31 each indicate a cycle name of pipeline processing of the arithmetic instructions.

First, in the P cycle, a register number is sent from the RS toward the FPR 172 of each element. The register number is transferred to the F0FPR and F1FPR by taking one cycle of PT, then the register number is transferred to the F2FPR and F3FPR by taking two cycles of PT and PT2, and the register number is transferred to the F{4-7}FPRs by taking three cycles of PT, PT2, and PT3.

In the subsequent B1 cycle, the value of the FPR 172 corresponding to the transferred register number is read out and sent to the calculation unit.

At this time, in a case where a calculation result of the previous instruction is reused without waiting for the writing of U and UT into the FPR 172, a calculation result of the FPU 171 in the X4 cycle is sent to the B2 cycle (bypass; see reference sign R1 in FIG. 30).

In the X1, X2, X3, and X4 cycles, calculations are simultaneously executed in the FPU 171 of each element (F{0-7}FPU), and the calculation of the X4 cycle is completed.

In the U and UT cycles, the calculation result is transferred to the FPR 172 of each element (F{0-7}FPR), and the calculation result is written therein.

In the C and W cycles (see FIG. 30), the instructions having been executed in the out-of-order mode are completed in the original execution order of the program, and the resources of various registers such as the FPR 172, memories, and the like are updated and released.

Each of z0, z1, z2, z3, and z4 in a sequence of instructions is a 512-bit register corresponding to the SIMD operation, and is able to process eight elements (F0 to F7) in parallel while using 64 bits as one element. Both the fadd instruction and the fsub instruction use the z2 register, and the calculation result of the fadd instruction is reused in the fsub instruction. When the fsub instruction attempts to receive input data from the FPR 172, it is to allow some time until the UT cycle in which the fadd instruction writes the calculation result into the FPR 172. However, by the calculation result of the fadd instruction in the X4 cycle being sent as it is to the B2 cycle, the calculation may be performed without waiting for the update of the FPR 172.

As illustrated in the time chart of FIG. 30, since the register number transfer cycles of the F4 to F7 are not changed from the three cycles of PT, PT2, and PT3 as compared with the related example, there is no improvement in the latency (see a reference sign R2).

Note that the F0 and F1 carry out the transfer in the PT cycle, the F23 carries out the transfer in the two cycles of PT and PT2, and the F4 to F7 carry out the transfer in the three cycles of PT, PT2, and PT3; thus, there is a time difference of three stages between the elements. However, the P cycle timings in the F01, F23, and F4 to F7 of the subsequent instructions as bypass destinations coincide with each other, and thus there is an advantage that the difference of each element does not have to be considered in the bypass timing control.

As described above, even when the SIMD width is widened from four elements to eight elements, and the time difference is extended to three stages, the implementation may be carried out in the P cycle timing control without considering the difference of each element.

In this case, when the instruction uses only the F01, since the transfer may be carried out in one cycle of PT with respect to three cycles of PT, PT2, and PT3 in the related example, the latency is improved by two cycles to be equivalent to the latency when using only the F01 in the case illustrated in FIGS. 28 and 29.

In the case of an instruction using only the F0123, the transfer may be carried out in only two cycles of PT and PT2 with respect to three cycles of PT, PT2, and PT3 in the related example, and thus the latency is improved by one cycle.

[B] EFFECTS

According to the arithmetic processing device and the arithmetic processing method in the embodiment described above, for example, the following action effects may be achieved.

The RSE 161 stores an arithmetic instruction. The data cache 18 caches a calculation result of an arithmetic instruction. Each of the plurality of FPRs 172 is arranged on the RSE 161 side and stores a register value used for executing an arithmetic instruction transferred from the RSE 161. Each of the plurality of FPUs 171 is arranged on the DATA cache 18 side and performs a floating point operation based on an arithmetic instruction. The number of cycles is one when a register value is transferred from the RSE 161 to one or more FPRs 172 arranged in the positions closest in distance to the RSE 161 among the plurality of FPRs 172.

This makes it possible to efficiently execute the floating point operation.

[C] OTHERS

The disclosed technology is not limited to the aforementioned embodiment but may be carried out with various modifications without departing from the spirit and scope of the present embodiment. Each of the configurations and each of the processes of the present embodiment may be employed or omitted as desired or may be combined as appropriate.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An arithmetic processing device, comprising:
an instruction storage configured to store an arithmetic instruction;
a data cache configured to cache a calculation result of the arithmetic instruction;
a plurality of floating-point registers arranged on a side of the instruction storage and configured to store a register value used for executing the arithmetic instruction transferred from the instruction storage; and
a plurality of floating point calculation circuits arranged on a side of the data cache and configured to perform a floating-point operation based on the arithmetic instruction,
wherein a number of cycles is one when the register value is transferred from the instruction storage to one or more floating-point registers, among the plurality of floating point registers, arranged in positions closest in distance to the instruction storage.

2. The arithmetic processing device according to claim 1, wherein the above one or more floating-point registers among the plurality of floating-point registers, and one or more floating-point calculation circuits arranged in positions closest in distance to the data cache among the plurality of floating-point calculation circuits are used for executing the arithmetic instruction.

3. The arithmetic processing device according to claim 1, wherein, after a load instruction or a store instruction is executed, the arithmetic instruction is executed.

4. An arithmetic processing method comprising:
storing an arithmetic instruction to an instruction storage;
caching a calculation result of the arithmetic instruction to a data cache;
storing a register value used for executing the arithmetic instruction transferred from the instruction storage to a plurality of floating-point registers arranged on a side of the instruction storage and configured to; and
performing a floating-point operation based on the arithmetic instruction by a plurality of floating-point calculation circuits arranged on a side of the data cache,
wherein a number of cycles is one when the register value is transferred from the instruction storage to one or more floating-point registers, among the plurality of floating-point registers, arranged in positions closest in distance to the instruction storage.

5. The arithmetic processing method according to claim 4, wherein the above one or more floating-point registers among the plurality of floating-point registers, and one or more floating-point calculation circuits arranged in positions closest in distance to the data cache among the plurality of floating-point calculation circuits are used for executing the arithmetic instruction.

6. The arithmetic processing method according to claim 4, wherein, after a load instruction or a store instruction is executed, the arithmetic instruction is executed.

* * * * *